(12) United States Patent
Ogawa

(10) Patent No.: US 10,841,435 B2
(45) Date of Patent: Nov. 17, 2020

(54) INFORMATION PROCESSING APPARATUS, NON-TRANSITORY COMPUTER-READABLE STORAGE MEDIUM, AND CONTROL METHOD FOR INFORMATION PROCESSING APPARATUS

(71) Applicant: CANON KABUSHIKI KAISHA, Tokyo (JP)

(72) Inventor: Katsuya Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/445,614

(22) Filed: Jun. 19, 2019

(65) Prior Publication Data

US 2020/0007698 A1    Jan. 2, 2020

(30) Foreign Application Priority Data

Jun. 29, 2018    (JP) .................................. 2018-125293

(51) Int. Cl.
*H04N 1/00* (2006.01)

(52) U.S. Cl.
CPC ..... *H04N 1/00196* (2013.01); *H04N 1/00188* (2013.01); *H04N 1/00416* (2013.01); *H04N 1/00442* (2013.01); *H04N 1/00639* (2013.01); *H04N 1/00641* (2013.01)

(58) Field of Classification Search
CPC .......... H04N 1/00196; H04N 1/00639; H04N 1/00416; H04N 1/00641; H04N 1/00442; H04N 1/00188
USPC ........................................................ 358/1.15
See application file for complete search history.

(56) References Cited

U.S. PATENT DOCUMENTS

| 7,394,562 | B2 | 7/2008 | Nakagiri et al. |
| 7,929,174 | B2 | 4/2011 | Nakagiri et al. |
| 10,303,990 | B1* | 5/2019 | Ishii ................... G06K 15/1868 |
| 2003/0053133 | A1 | 3/2003 | Nakagiri et al. |
| 2008/0239398 | A1 | 10/2008 | Nakagiri et al. |
| 2010/0131566 | A1* | 5/2010 | Sato ..................... G06F 40/166 |
| | | | 707/802 |

FOREIGN PATENT DOCUMENTS

JP    2003-162520 A1    6/2003

* cited by examiner

*Primary Examiner* — Tammy Paige Goddard
*Assistant Examiner* — Darryl V Dottin
(74) *Attorney, Agent, or Firm* — Venable LLP

(57) ABSTRACT

An information processing apparatus causes a display to display, based on a plurality of page data included in data of a book and print setting information, a setting screen including sheet preview images indicating print results of sheets forming the book and an interface for accepting selection of the sheet, and identifies the sheet to be printed by accepting, from a user, selection of the sheet via the interface in the setting screen.

18 Claims, 16 Drawing Sheets

FIG. 7

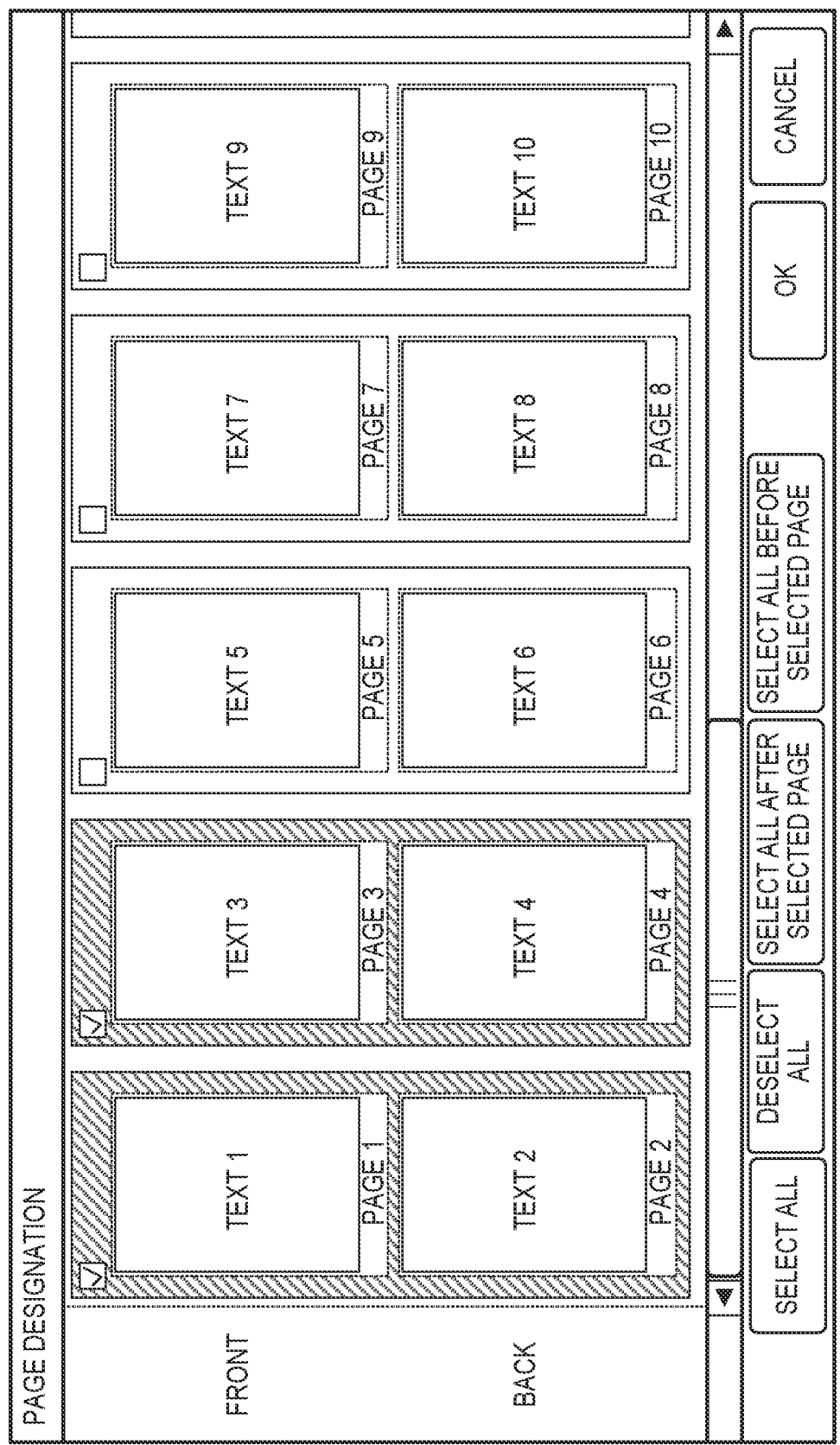

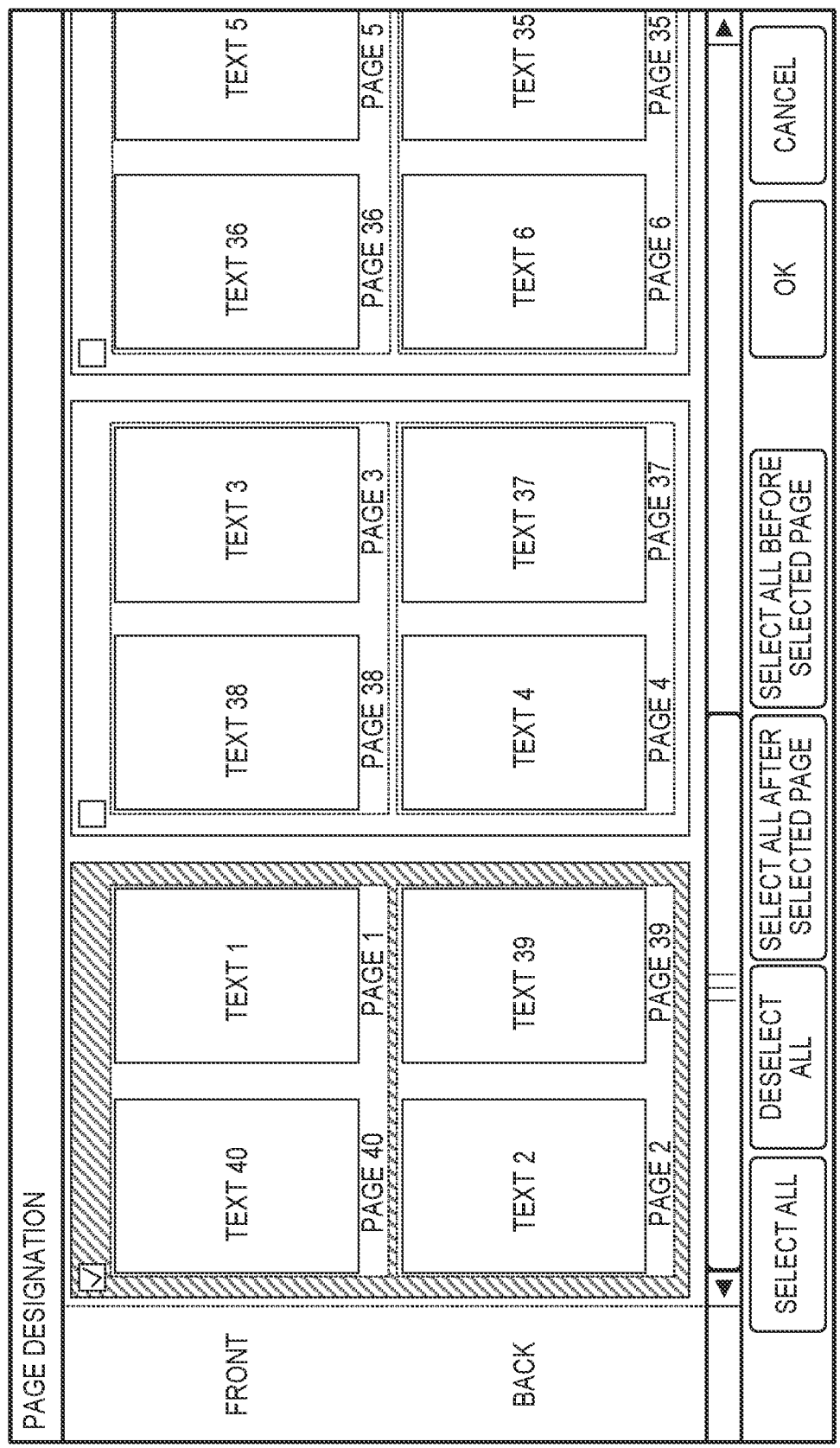

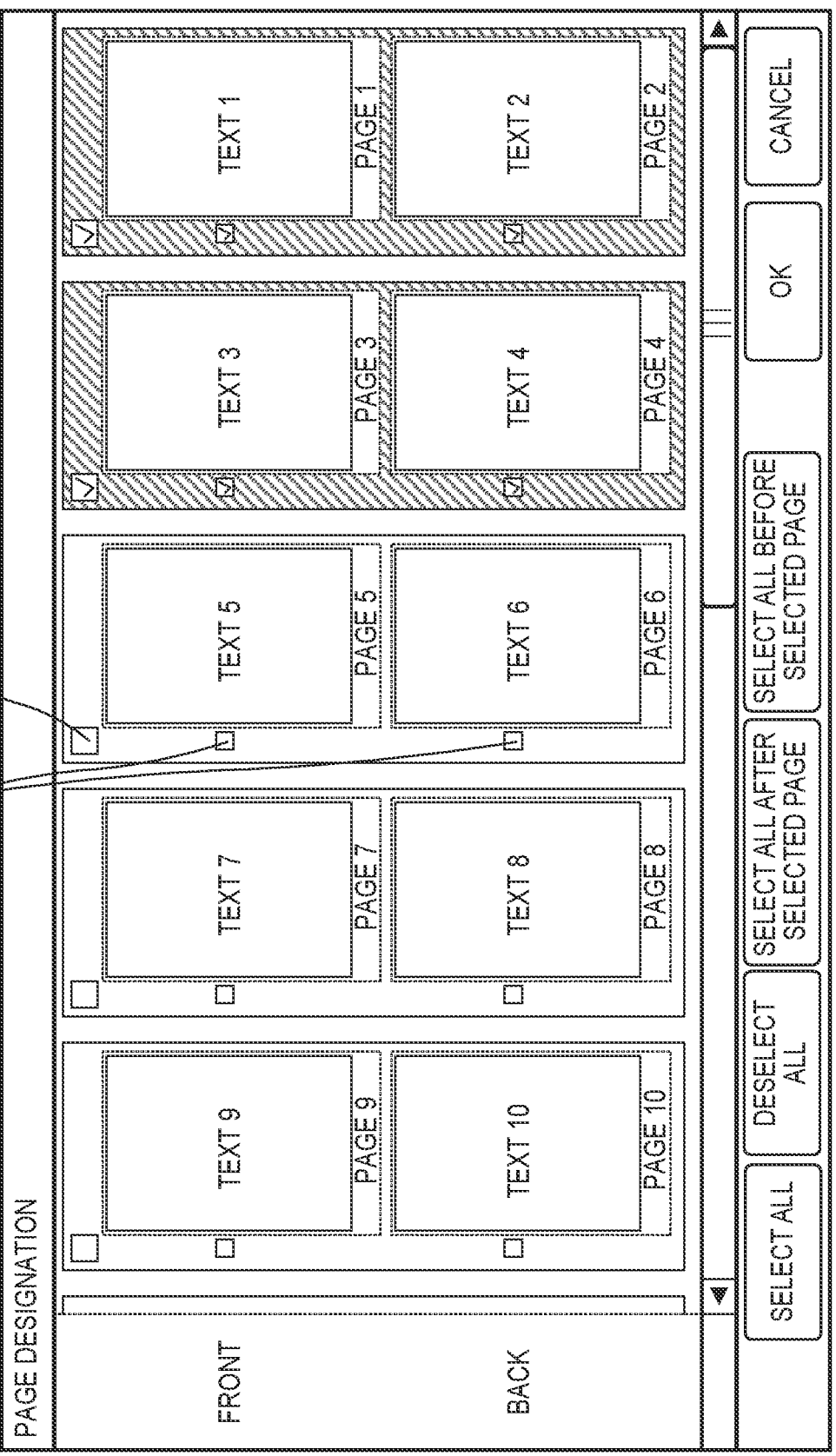

INFORMATION PROCESSING APPARATUS, NON-TRANSITORY COMPUTER-READABLE STORAGE MEDIUM, AND CONTROL METHOD FOR INFORMATION PROCESSING APPARATUS

BACKGROUND OF THE INVENTION

Field of the Invention

The present invention relates to a bookbinding printing technique.

Description of the Related Art

There is provided a technique of causing a printer to print a book. Japanese Patent Laid-Open No. 2003-162520 describes a printing method of executing bookbinding printing, and describes that when executing bookbinding printing, printing can be executed by designating a sheet number. When printing a book, if, for example, a printing error occurs in a specific page, a situation in which a user wants to reprint only that page may occur. However, in the technique described in Japanese Patent Laid-Open No. 2003-162520, the user needs to recognize a sheet to which the specific page to be printed is allocated, and further improvement of convenience is required.

SUMMARY OF THE INVENTION

The present invention provides a technique of improving the convenience of bookbinding printing.

According to one aspect of the present invention, there is provided an information processing apparatus comprising: at least one processor; and at least one memory coupled to the at least one processor, wherein the at least one memory stores a computer program that causes, when executed by the at least one processor, the information processing apparatus to: cause a display to display, based on a plurality of page data included in data of a book and print setting information, a setting screen including sheet preview images indicating print results of sheets forming the book and an interface for accepting selection of the sheet; and identify the sheet to be printed by accepting, from a user, selection of the sheet via the interface in the setting screen.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a view showing an example of the edit screen in the bookbinding application;

FIGS. 11A and 11B are views each showing an example of a page designation printing setting screen;

FIGS. 12A and 12B are views each showing an example of the page designation printing setting screen; and FIGS. 13A and 13B are views each showing an example of the page designation printing setting screen.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System and Apparatus Arrangements)

Figure 1:
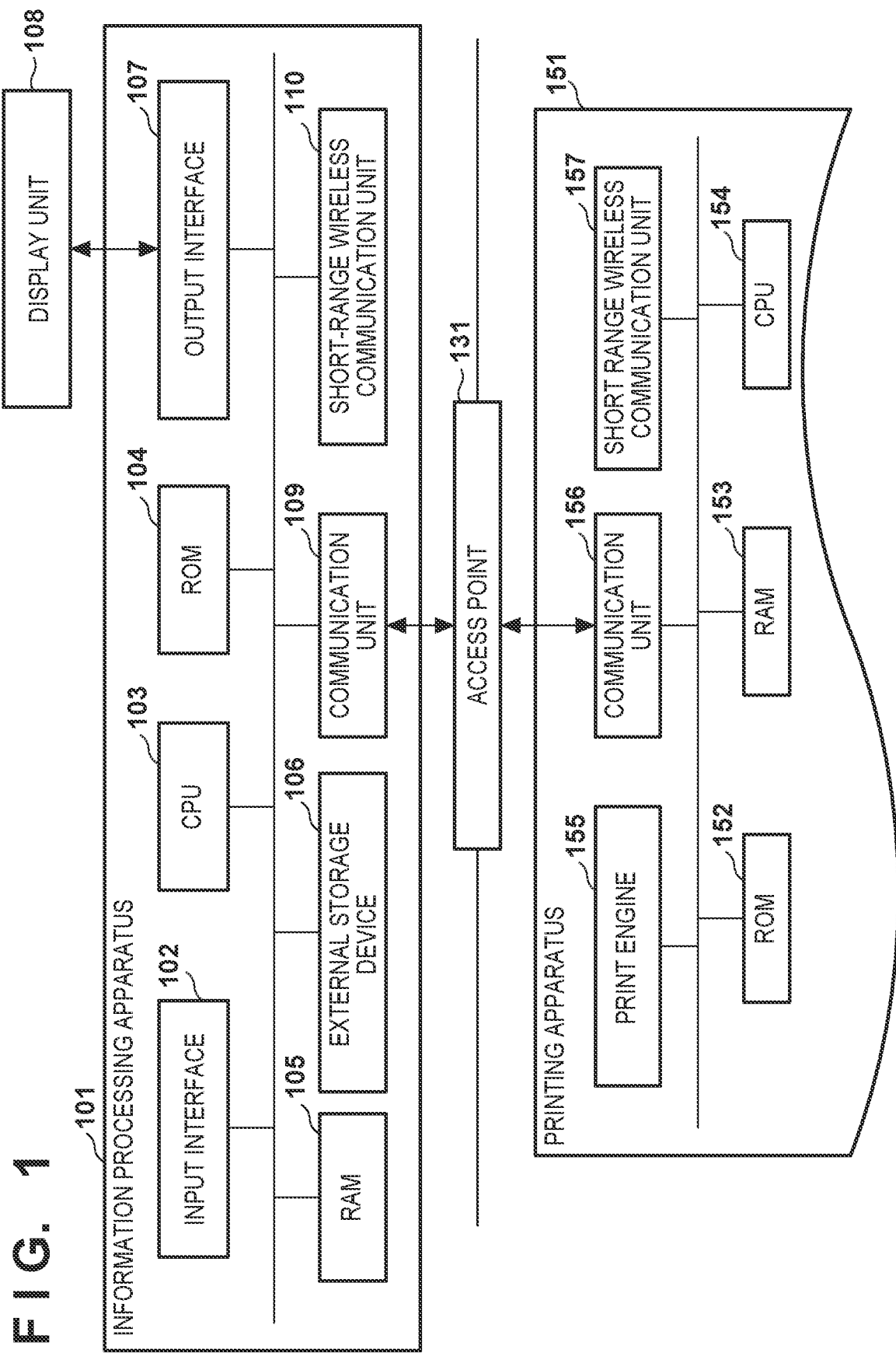
FIG. 1 is a block diagram showing an example of a system arrangement and examples of the hardware arrangements of apparatuses.

An example of a system arrangement according to this embodiment will be described with reference to FIG. 1. This system includes an information processing apparatus 101 and a printing apparatus 151, and executes print processing by transmitting print data prepared by the information processing apparatus 101 to the printing apparatus 151 via a network. Note that communication between the information processing apparatus 101 and the printing apparatus 151 can be performed via an access point 131 by, for example, a wireless LAN complying with the IEEE802.11 standard series. Note that although an embodiment based on a network arrangement using the access point 131 will be described below, another arrangement in which the information processing apparatus 101 and the printing apparatus 151 are communicable with each other may be used. For example, the information processing apparatus 101 and the printing apparatus 151 may be connected via a wired line (not shown). Furthermore, an apparatus having both the function of the information processing apparatus 101 and the function of the printing apparatus 151 may be used. In this case, information can be exchanged between the information processing apparatus 101 and the printing apparatus 151 via buses in the apparatuses and the like. A plurality of blocks shown in FIG. 1 may be integrated into one block and one block may be divided into a plurality of blocks. In addition, a block other than those shown in FIG. 1 may be added, and one or more of the blocks shown in FIG. 1 may be omitted.

The information processing apparatus 101 is an arithmetic apparatus capable of converting print target data into print data, such as a personal computer (PC), a smartphone, a mobile terminal, a notebook PC, a tablet terminal, or a PDA (Personal Digital Assistant). The printing apparatus 151 is an arbitrary printer capable of executing print processing by acquiring print data from an external apparatus such as the information processing apparatus 101. Assume that the printing apparatus 151 executes printing by the inkjet method in this embodiment. However, for example, the printing apparatus 151 may execute printing by another arbitrary method such as an electrophotographic method. The printing apparatus 151 may be a Multi Function Peripheral having a plurality of functions such as a copy function, a FAX function, and a print function.

The information processing apparatus 101 includes, for example, an input interface 102, a CPU 103, a ROM 104, a RAM 105, an external storage device 106, an output interface 107, a communication unit 109, and a short-range wireless communication unit 110. CPU, ROM, and RAM are acronyms for "Central Processing Unit", "Read Only Memory", and "Random Access Memory", respectively. Note that although FIG. 1 shows an example a case in which the information processing apparatus 101 displays information on a display device (display unit 108) such as an external display, the information processing apparatus 101 may include the display unit 108.

The input interface 102 is an interface for accepting a data input and an operation instruction from a user. The input interface 102 is formed by, for example, a physical keyboard, buttons, a touch panel, or the like. Note that the output interface 107 (to be described later) and the input interface 102 may be integrated so that output of a screen and acceptance of an operation from the user are performed using common hardware.

The CPU 103 serves as a system control unit, and controls the overall information processing apparatus 101. The ROM 104 stores permanent data such as control programs to be executed by the CPU 103, data tables, and an embedded operating system (to be referred to as an "OS" hereinafter) program. In this embodiment, the control programs stored in the ROM 104 perform software execution control such as scheduling, task switching, and interrupt processing under the management of the embedded OS stored in the ROM 104. The RAM 105 is implemented by an SRAM (Static Random Access Memory) or the like that needs a backup power supply. Note that the RAM 105 holds data by a primary battery (not shown) for data backup, and can thus store important data such as program control variables without volatilizing them. The RAM 105 can be provided with a memory area to store setting information and management data of the information processing apparatus 101, and the like. The RAM 105 can also be used as the main memory and work memory of the CPU 103.

The external storage device 106 saves an application for providing a print execution function, a print information generation program for generating print information interpretable by the printing apparatus 151, and the like. The external storage device 106 can also save various programs such as a control program for transmitting/receiving information to/from another apparatus (for example, the printing apparatus 151) connected via the communication unit 109, and various kinds of information to be used by these programs.

The output interface 107 is an interface used by the display unit 108 to perform information presentation control (information display control) for displaying data and presenting information of the state of the information processing apparatus 101. The output interface 107 outputs control information and display target information for causing the display unit 108 to display the information. The display unit 108 includes an LED (Light Emitting Diode) and LCD (Liquid Crystal Display), and displays data and notifies the user of the state of the information processing apparatus 101. Note that a software keyboard including keys such as numerical value input keys, a mode setting key, an enter key, a cancel key, and a power key may be displayed on the display unit 108, and an input from the user may be accepted via the software keyboard.

The communication unit 109 includes a radio frequency (RF) circuit and a baseband circuit for executing data communication by performing connection to an external apparatus such as the printing apparatus 151. For example, the communication unit 109 can communicate with the printing apparatus 151 via the access point 131 existing separately from the information processing apparatus 101 and the printing apparatus 151. The access point 131 can be, for example, a device such as a wireless LAN router that operates in accordance with a wireless communication method complying with the IEEE802.11 standard series. Furthermore, the communication unit 109 may establish direct connection to the printing apparatus 151 in accordance with a protocol such as Wi-Fi (Wireless Fidelity) Direct®. If the printing apparatus 151 includes an access point (not shown), the communication unit 109 may be connected to the access point to establish direct connection to the printing apparatus 151. Note that the communication unit 109 can be configured to perform communication by WiFi® but may perform communication by another wireless communication method such as Bluetooth®.

The short-range wireless communication unit 110 executes data communication by establishing wireless connection to the short-range wireless communication unit 157 of the printing apparatus 151 based on at least the fact that the printing apparatus 151 (external apparatus) enters a predetermined short-range area. The short-range wireless communication unit 110 performs communication by a communication method different from that of the communication unit 109, such as Bluetooth Low Energy (BLE).

The printing apparatus 151 includes, for example, a ROM 152, a RAM 153, a CPU 154, a print engine 155, a communication unit 156, and a short-range wireless communication unit 157.

The communication unit 156 includes a radio frequency (RF) circuit and a baseband circuit for performing connection to an external apparatus such as the information processing apparatus 101. The communication unit 156 corresponds to the communication unit 109 of the information processing apparatus 101, and performs communication by a wireless communication method such as Wi-Fi or Bluetooth. The communication unit 156 may be directly connected to the communication unit 109 of the information processing apparatus 101 by functioning as an access point or in accordance with a predetermined protocol, as described above, or may be connected to the communication unit 109 via the external access point 131 or the like. If the communication unit 156 functions as an access point, the communication unit 156 may have hardware for functioning as an access point, or may use software that allows the communication unit 156 to function as an access point. Note that although the information processing apparatus 101 and the printing apparatus 151 are connected to the one access point 131 in the example of FIG. 1, they may be connected to different access points connected to the network, and may be connected to each other via the network.

The short-range wireless communication unit 157 executes data communication by establishing wireless connection to the short-range wireless communication unit 110 of the information processing apparatus 101 based on at least the fact that the information processing apparatus 101 (external apparatus) enters a predetermined short-range area. The short-range wireless communication unit 157 corresponds to the short-range wireless communication unit 110 of the information processing apparatus 101, and performs communication by a wireless communication method such as BLE. Note that, for example, print information transmitted from the information processing apparatus 101 or the like has a large amount of data, requires high-speed large-capacity communication, and is thus received via the communication unit 156 capable of performing communication at a speed higher than that of the short-range wireless communication unit 157.

The RAM 153 is a memory similar to the RAM 105. The RAM 153 is provided with a memory area to store setting information and management data of the printing apparatus 151, and the like. The RAM 153 is also used as the main memory and work memory of the CPU 154, functions as a reception buffer for temporarily saving print information received from the information processing apparatus 101 or the like, and also saves various kinds of information. The ROM 152 stores permanent data such as control programs to be executed by the CPU 154, data tables, and an OS program. When the CPU 154 executes the control programs stored in the ROM 152, software execution control such as scheduling, task switching, and interrupt processing can be executed under the management of the embedded OS stored in the ROM 152. The CPU 154 serves as a system control unit, and controls the overall printing apparatus 151. Note that a memory such as an external HDD or SD card may be mounted as an optional device on the printing apparatus 151, and the information saved in the printing apparatus 151 may be saved in such memory.

The print engine 155 forms an image on a print medium such as a sheet using a recording material such as ink based on the information saved in the RAM 153 and the print information received from the information processing apparatus 101 or the like, and outputs a print result.

Figure 2:
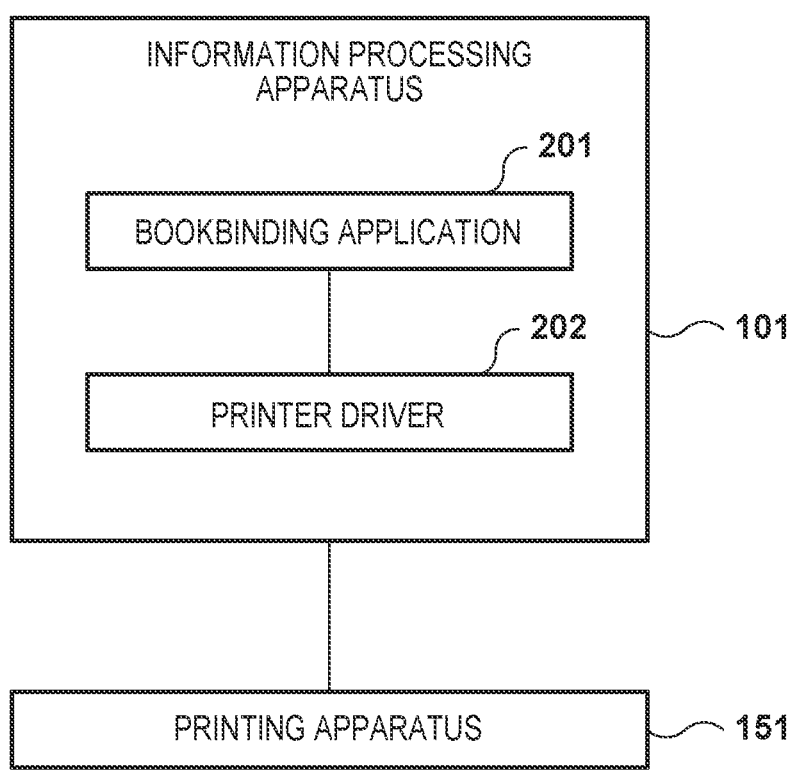
FIG. 2 is a block diagram showing an example of the software arrangement of the information processing apparatus.

FIG. 2 is a block diagram showing an example of the functional arrangement of the information processing apparatus 101. The information processing apparatus 101 includes, for example, as functional components, a bookbinding application 201 that executes processing (to be described later), and a printer driver 202 that generates print data interpretable by the printing apparatus 151. When the user inputs a print instruction to the screen of the bookbinding application 201 (to be described later), the printer driver 202 receives application data output from the bookbinding application 201, and generates print data. Note that the print instruction in the screen of the bookbinding application 201 corresponds to, for example, the pressing of an OK button shown in FIG. 10.

Then, when the printer driver 202 transmits the print data generated by the bookbinding application 201 to the printing apparatus 151, the printing apparatus 151 executes print processing.

(Overview of Operation of Bookbinding Application)

Figure 3:
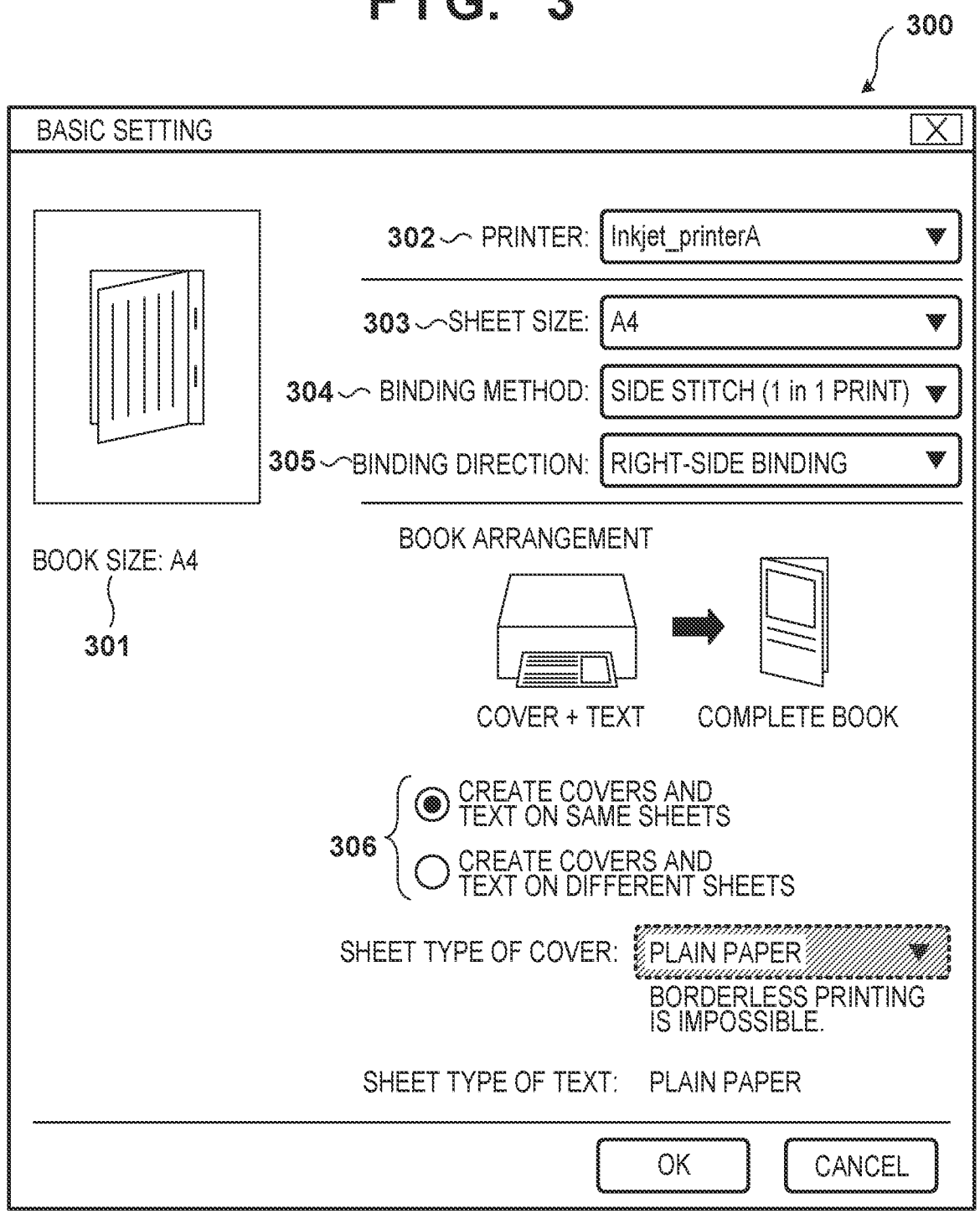
FIG. 3 is a view showing an example of the basic setting screen of a bookbinding application.

Subsequently, an example of the procedure of the bookbinding operation by the above-described bookbinding application 201 will be described. FIG. 3 shows an example of a basic setting screen displayed on the display unit 108 when the CPU 103 of the information processing apparatus 101 executes, for example, programs corresponding to the bookbinding application 201 stored in the ROM 104 and the external storage device 106. As an example, a basic setting screen 300 includes a post-bookbinding image 301, a printer selection region 302, a sheet size selection region 303, a binding method setting region 304, a binding direction setting region 305, and a cover sheet-related setting region 306. Note that in this embodiment, when the CPU 103 reads out the programs concerning the bookbinding application 201 and executes them, display control shown in FIGS. 3 to 13B is executed, unless otherwise specified.

The printer selection region 302 is a region where a printing apparatus to be used is selected. When a pull-down button in the printer selection region 302 is pressed by a user operation, a list of printing apparatuses usable by the information processing apparatus 101 is displayed, and the user can select a printing apparatus to be used to create a book by the bookbinding application 201. Note that with respect to the list of the printing apparatuses displayed when the pull-down button in the printer selection region 302 is pressed, only printing apparatuses supportable by the bookbinding application 201 can be displayed. However, the present invention is not limited to this. For example, all the printing apparatuses usable by the information processing apparatus 101 may be displayed regardless of whether they can be supported by the bookbinding application 201.

The sheet size selection region 303 is a region where a sheet size to be used for bookbinding is selected. When a pull-down button in the sheet size selection region 303 is pressed by a user operation, a list of sheet sizes usable by the printing apparatus selected in the printer selection region 302 is displayed. The user can select, from the displayed list of the sheet sizes, one size corresponding to the size of a book to be created. Note that information of the sheet sizes usable by the printing apparatus selected in the printer selection region 302 can be acquired from the printing apparatus via, for example, the printer driver 202.

The binding method setting region 304 is a region where a binding method of a book is set. When a pull-down button in the binding method setting region 304 is pressed by a user operation, for example, "side stitch" and "saddle stitch" are selectably displayed. "Side stitch" is a binding method of performing bookbinding at a position a predetermined distance away from a spine portion of a book using a staple or the like. "Saddle stitch" is a binding method of performing bookbinding at a folding portion of doubled sheets using a staple or the like, and a binding method of generating a book by overlaying a plurality of printed sheets and then doubling them. If "saddle stitch" is selected, it is assumed that the sheets are doubled, and thus a 2-in-1 print setting can be selected automatically. Note that if "saddle stitch" is selected, for example, settings such as 4-in-1 other than 1-in-1 may be selectably displayed. Note that if "side stitch" is selected, a 1-in-1 print setting can be selected automatically. In this case as well, however, settings such as 2-in-1 and 4-in-1 may be selectably displayed. Note that if 2-in-1 is not selected for "saddle stitch" or if 1-in-1 is not selected for "side stitch", page allocation (to be described later) is different accordingly.

The binding direction setting region 305 is a region where a binding direction of a book is set. When a pull-down button in the binding direction setting region 305 is pressed by a user operation, for example, "right-side binding" and "left-side binding" are selectably displayed. In some cases, "upper binding" may be selectably displayed. "Right-side binding" indicates a binding direction that binds the right side of the front cover, and "left-side binding" indicates a binding direction that binds the left side of the front cover. In addition, "upper binding" indicates a binding direction that binds the upper portion of the cover. A string "binding direction" in the binding direction setting region 305 may be replaced by "open direction" or the like. Right-open corresponds to right-side binding and left-open corresponds to left-side binding. The setting in this region determines whether the pages of a book to be created advance from right to left or from left to right.

The cover sheet-related setting region 306 is a region where a cover sheet is set. For example, radio buttons that allow the user to select one of an item for creating covers and text by the same type of sheets and an item for creating covers and text by different types of sheets are displayed. Note that if, in the setting region 306, the covers and text are created by the same type of sheets, the sheet type (for example, "plain paper" or the like) of the text is set as the sheet type of the covers, and thus the region that allows selection of the sheet type of the covers is grayed out so as not to be selected. On the other hand, if the setting of creating covers and text by different types of sheets is selected in the setting region 306, the region that allows selection of the sheet type of the covers is activated. Then, when a pull-down button in the region where the sheet type of the covers is set is pressed, a list of selectable sheet types (for example, glossy paper, plain paper, and the like) is displayed. Note that, for example, if "plain paper" is selected, a character string "borderless printing is impossible" can be displayed, and if "glossy paper" is selected, a character string "borderless printing is possible" can be displayed. In addition, necessary information may be set for each sheet type, and a character string corresponding to the sheet type selected by a user operation may be displayed. Furthermore, if the setting of creating covers and text by different types of sheets is selected, a message such as "it is necessary to print by setting different sheets for cover/text" may be displayed.

When "OK" is pressed in the basic setting screen shown in FIG. 3, the screen transitions to an edit screen. The edit screen may be different in accordance with the setting items such as the binding method and the setting of whether the sheet type of the covers is set to be the same as that of the text. Examples of the edit screen corresponding to the basic settings will be described below.

[Case in which Side Stitch is Selected and Covers and Text are Created by Same Type of Sheets]

Figure 4:
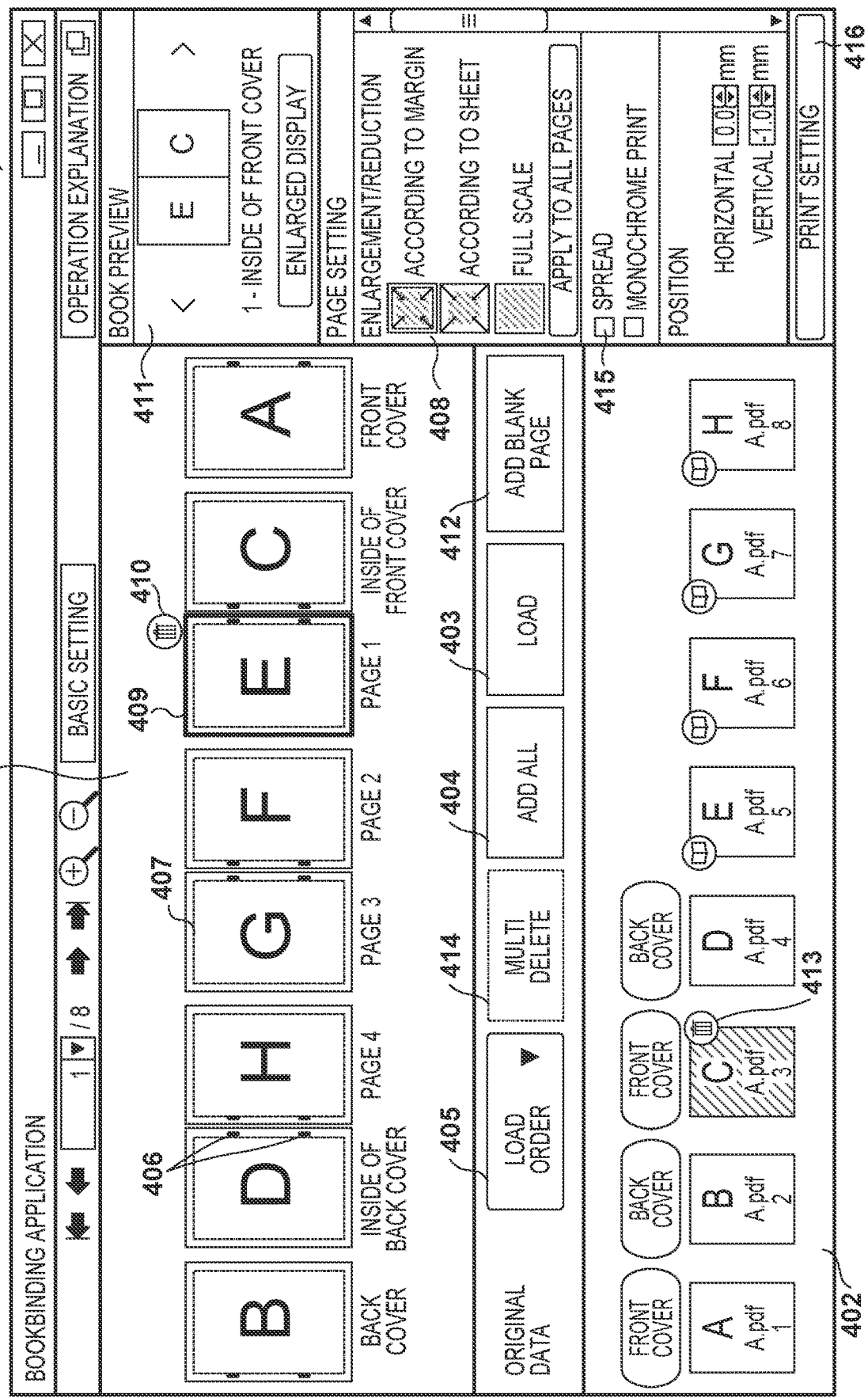
FIG. 4 is a view showing an example of an edit screen in the bookbinding application.

FIG. 4 shows an example of the edit screen when the binding method is side stitch (1-in-1), right-side binding is selected, and the setting of using the same type of sheets for the covers and text is made. Note that the example of FIG. 4 shows an example of a state in which page data for eight pages (from a page where "A" is written to a page where "H" is written) have already been loaded. In a stage before a document is loaded, an edit region 401 and an original data region 402 are in a predetermined state (for example, a blank state) in which the user can recognize that no document has been loaded. Note that in, for example, the stage before the document is loaded, a message such as "please load original data to be put in a book" may be displayed in the edit region 401, and a message that notifies the user of a method of loading data may further be displayed. Note that such message may be displayed in the original data region 402. Another method such as display of a dialog may be used to prompt the user to load original data. Note that one original data may be loaded or a plurality of original data may be loaded.

When the user clicks on a "load" button 403, for example, a file selection dialog is displayed, and the user selects, from a displayed file list, a file (original data) to be used to create a book. When a file is selected, page data included in the file are expanded in the original data region 402. Similarly, a result of automatically allocating the page data included in the file based on a page order and the setting contents in the basic setting screen 300 can be displayed in the edit region 401. Automatic page allocation can be performed so that, for example, page data of the first to fourth pages in the file are set as "front cover", "back cover", "back surface (inside) of front cover", and "back surface (inside) of back cover", respectively, and page data of the subsequent pages are set as text. The edit region 401 shown in FIG. 4 shows an example of a case in which automatic page allocation is performed in this way. In the expanded file, the page data of the first page where "A" is written is allocated to the front cover and the page data of the second page where "B" is written is allocated to the back cover. Then, the page data of the third page where "C" is written is allocated to the inside of the front cover and the page data of the fourth page where "D" is written is allocated to the inside of the back cover. That is, the bookbinding application 201 generates data of a book as a result of allocating the page data included in the original data, and displays a preview image of each page in the edit region 401 of FIG. 4 based on the generated data of the book. Note that the page data of the first and second pages of the file may be allocated to "front cover" and "inside of front cover", and the page data of the last page and the second page from the last in the file may be allocated to "back cover" and "inside of back cover". Note that FIG. 4 and some following examples show an example of a case in which right-side binding is selected, and the front cover is displayed at the rightmost end and the back cover is displayed at the leftmost end. However, if left-side binding is selected, the front cover is displayed at the leftmost end and the back cover is displayed at the rightmost end.

Note that when the page data included in the file are expanded in the original data region 402, for example, a confirmation message such as "do you want to perform automatic page allocation?" may be displayed to accept user determination of whether to automatically perform page allocation. In this case, if the user approves automatic page allocation, a result of performing automatic page allocation is displayed in the edit region 401; otherwise, the edit region 401 may remain blank. Alternatively, the page data included in the selected file may only be expanded in the original data region 402 without performing automatic page allocation regardless of user determination. Note that even if automatic page allocation is not performed, when the user clicks on an "add all" button 404, automatic page allocation of the page data is performed in the order of the pages included in the file.

Note that when a plurality of files are read out, all page data included in the plurality of files are expanded in the original data region 402. At this time, the order of the page data to be expanded can be decided by a pull-down menu 405. For example, if, as shown in FIG. 4, "load order" is selected, the page data are expanded in the original data region 402 in an order such that page data of a file selected earlier is displayed on the left side. To the contrary, if, for example, "file name order" (not shown) is selected, the page data are expanded in ascending (descending) order of file names. If, for example, a file whose name is "A.pdf" is opened after a file whose name is "B.pdf", when "load order" is selected, page data of "A.pdf" is displayed on the right side of a position at which data of "B.pdf" is displayed. On the other hand, if "file name order" is selected, even if "B.pdf" is opened first, the page data of "B.pdf" is displayed on the right side of a position at which the page data of "A.pdf" is displayed. Note that the sort order is not limited to the load order or the file name order, and various orders such as the order of the file creation date (update date) and the order of the use frequency in this application can be used.

Images of the page data allocated in order of display when the pages of the book after completion are turned over are displayed in the edit region 401. Note that the page data are included in the above-described data of the book. That is, the data of the book includes page data corresponding to a plurality of pages forming the book. Furthermore, display is performed so that the distance between two pages displayed in a spread is shorter than the distance to another page that is adjacent but is not displayed in a spread. This allows the user to readily determine a page forming a spread of the book and a page forming no spread. In the example of FIG. 4, when the distance between the page where "C" is written and the page where "E" is written is sufficiently short, it is understood that these pages are pages forming a spread. On the other hand, when the distance between the page where "E" is written and the page where "F" is written is longer than that between the page where "C" is written and the page where "E" is written, it is understood that these pages are adjacent to each other but are not pages forming a spread. In this way, the images of all the pages are displayed in the edit region 401 based on the page data of the pages included in the data of the book. Note that the example of FIG. 4 shows an example of a case in which all the pages included in the data of the book can be displayed as a whole. However, if the number of pages increases while maintaining the state in which all pages are displayed, the size of each page may be small. To cope with this, the bookbinding application 201 can be configured to perform enlargement/reduction display of each page. At this time, if all the pages cannot be displayed in the edit region 401, a display area can be moved by, for example, displaying a scroll bar in the lower portion of the edit region 401.

Note that if side stitch is selected, binding positions 406 by a staple are also displayed. The binding positions 406 can be displayed by, for example, a predetermined color (for example, red) so that the user can recognize them. The display of the binding positions 406 can be printed intact, and the user can bind the book at the positions using the staple.

In each page displayed in the edit region 401, a boundary 407 indicating the boundary between a printable region and a margin region is displayed. When the user inputs each setting value in a region of page setting 408, the page data is laid out in the page based on the setting values. For example, in the page setting 408, the user sets whether to enlarge/reduce the original data in accordance with the margin or sheet, sets whether to display in a full scale, and sets vertical and horizontal positions. The vertical and horizontal positions are set by moving the position of the original data in the page upward or leftward by a negative value, and moving the position of the original data in the page downward or rightward by a positive value. This allows the user to set in detail how the page data is laid out in the page. Note that these settings can be applied for each page. For example, in the state in which the page where "E" is written is selected in the edit region 401, when the setting values are input in the page setting 408, the setting values are applicable to only the selected page. Note that when "apply to all pages" is selected in the page setting 408, the input settings are collectively applied to all the pages. Note that at this time, the user can recognize the selected page when a page frame 409 of the page where "E" is written is highlighted, thereby recognizing that settings are being made for the specific page. In addition, the user can delete the page from the edit region 401 by pressing, for example, an icon 410.

Figure 5:
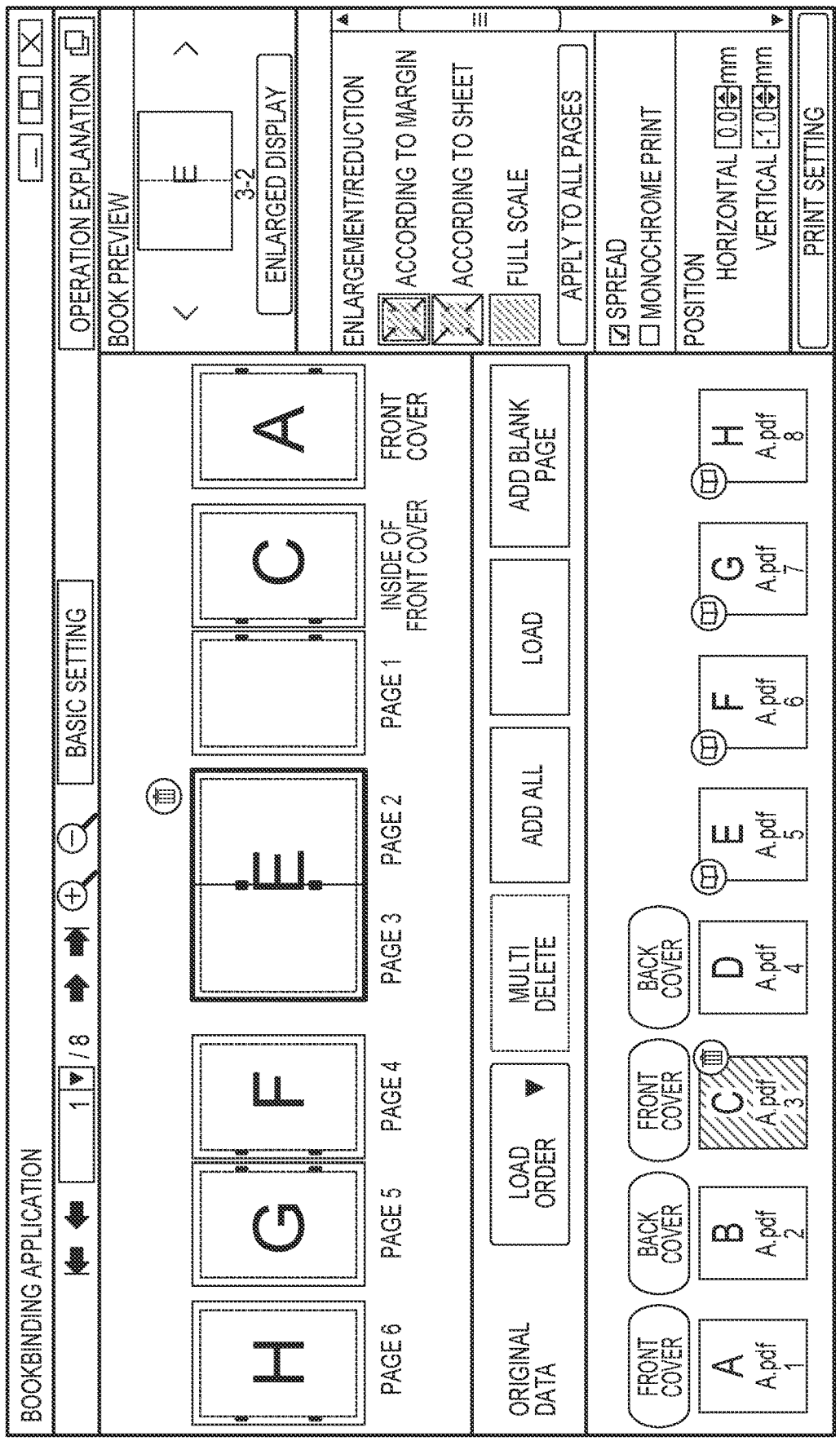
FIG. 5 is a view showing an example of the edit screen in the bookbinding application.

The user can set a spread attribute for one page data by selecting a "spread" checkbox 415. FIG. 5 shows a display example when the "spread" checkbox 415 is selected in the state in which the page where "E" is written is selected, as shown in FIG. 4. When the "spread" checkbox 415 is selected, a spread attribute is imparted to the page data corresponding to the selected page. Then, the page data to which the spread attribute is imparted is allocated to a region of two pages in the edit region. Although different from FIGS. 4 and 5, a case in which the "spread" checkbox 415 is selected in a state in which an even-numbered page of the text (a right page of a spread for right-side binding or a left page of a spread for left-side binding) is selected will be described. In this case, page data allocated to the selected page is displayed at the center of the spread including the selected page. Then, the page data are reallocated so that the pages after the selected page are shifted backward by one page. That is, in this case, the bookbinding application 201 generates a new spread region by adding one page after the selected page, and lays out the page data of the selected page at the center of the new spread region.

On the other hand, if an odd-numbered page of the text, like the page where "E" is written in FIG. 4, is selected, the next page of the selected page is included in a spread different from a spread including the selected page. Note that the odd-numbered page indicates the left page of the spread for right-side binding or the right page of the spread for left-side binding. Therefore, if only one page is added after the selected page to generate a new spread region, and one page data is allocated to the new spread region, the bookbinding application 201 cannot display the page data as a spread. Therefore, if, for example, the "spread" checkbox 415 is selected in the state in which the odd-numbered page of the text is selected, as shown in FIG. 5, one page can be added not only after but also before the selected page. This allows the bookbinding application 201 to allocate the page data of the selected page to one spread region. Note that in this case, the page data are reallocated so that the pages after the selected page are shifted backward by two pages.

When the "spread" checkbox 415 is selected in the state in which the odd-numbered page is selected, a message for notifying the user that one page is added before the selected page may be displayed. If the user approves addition of the page, a spread attribute is set for the selected page data, and the selected page data may be laid out over a plurality of pages. This can prevent addition of a page unintended by the user. Note that if the user does not approve addition of a page, setting of a spread attribute may be canceled. When the "spread" checkbox 415 is selected in the state in which the odd-numbered page is selected, a space for one page may be added after the selected page to allocate the selected page to a region for two pages without displaying the above-described message. Note that when such allocation is performed, the bookbinding application 201 may display a message indicating that the page data of the selected page is not laid out intact in the spread region.

When the "spread" checkbox 415 is cleared after the spread attribute is set for the page data, the spread attribute of the page data is released. As a result, the (preceding and succeeding) pages added at the time of allocation are deleted, and the pages after the pages are reallocated. Note that, for example, a message indicating whether to delete pages such as blank pages added when the odd-numbered page is allocated to the spread may be displayed.

Note that when horizontally long page data is dragged and dropped in the edit region 401 (or allocated automatically), a spread attribute may be set automatically for the page data. In this case, the "spread" checkbox 415 is selected automatically. Furthermore, if the insertion position of the page data is an odd-numbered page, a blank page or the like may be inserted before the page, as described above, or predetermined error display or the like may be performed. When, after the spread attribute is set for the horizontally long page data and the page data is allocated to the spread region, the "spread" checkbox 415 is cleared, the spread attribute of the horizontally long page data is released. As a result, the horizontally long page data can be allocated to one-side page forming the spread (for example, by reduction or rotation). Note that the horizontally long page data may be allocated to one-side page, similarly to a vertically long page without automatically setting the spread attribute for the horizontally long page data. Referring back to FIG. 4, with respect to the selected page, an image of the spread including the page after bookbinding is displayed as a book preview 411, and thus the user can readily recognize the state of the selected page after completion of the book. Note that when "<" or ">" in the preview is selected, a preview of an adjacent spread can be displayed. At this time, the selected page may move together, or only the pages of the preview may move without synchronizing the selected page and the preview with each other.

The user can operate the page data expanded in the original data region 402 for each page. For example, the user can select one page data in the original data region 402, and drag and drop it in the edit region 401, thereby adding the page data as one page of the book. FIG. 4 shows a state in which the page where "C" is written is selected from the data expanded in the original data region 402. If the selected page data is dragged and dropped in an arbitrary position of the edit region 401, it is incorporated in the data of the book as a page corresponding to the dropped position. For example, the page data is dragged and dropped in a predetermined area, in the edit region 401, between the page where "F" is written and the page where "G" is written. This operation causes the bookbinding application 201 to generate data of the book in which the page data where "C" is written is inserted between the page data of "F" and the page data of "G". Note that if such page data is inserted, the spread relationship is reconstructed based on the data of the book after insertion. That is, the page of "F" and the newly added page of "C" have the spread relationship, and the page of "G" has the spread relationship with the page of "H" due to addition of the page of "C".

Furthermore, the user can add a blank page by pressing an "add blank page" button 412. For example, if the "add blank page" button 412 is pressed in the state in which the page where "C" is written is selected, a blank page is added between the page where "C" is written and the page where "E" is written. In this case, the bookbinding application 201 generates data of the book including blank page data between the page data of "C" and "E". A blank page may be added to the right or left side of the selected page in accordance with a predetermined rule or, if two pages are selected, may be added between the two pages. Thus, if the back surfaces of the covers are desirably blank, or in accordance with the user's preferences or the like, a blank page can be added to an arbitrary position in the book.

Note that if the page data in the original data region 402 is used in the edit region 401, information for specifying it is added at the upper left position of each data. Referring to FIG. 4, the page data where "A" is written and the page data where "C" is written are used for the front cover (and its back surface). Then, the page data where "B" is written and the page data where "D" is written are used for the back cover (and its back surface). Then, other page data are used for the text. This allows the user to recognize that, for example, page data to be included as a page in the book is not used in the edit region 401 or page data not to be included in the book is unwantedly used. In addition, the user can recognize whether page data to be used for the cover is appropriate. The user can delete page data not to be used for creation of the book in the original data region 402. For example, the user can select an icon 413 displayed at the upper right position of the data in the selected state to delete the selected page data from the original data region 402. This can prevent an edit operation from becoming cumbersome due to the existence of many data not to be used in the original data region 402.

Furthermore, in the original data region 402, it is possible to select a plurality of data and collectively operate them. For example, in a state in which the page data where "C" is written and the page data where "D" is written are selected, the page data are collectively dragged and dropped in the edit region 401. This operation can insert these page data into the data of the book as two successive pages. The same applies to a case in which three or more page data are selected. Furthermore, if a "multi delete" button 414 is pressed in a state in which a plurality of page data are selected, the plurality of page data can collectively be deleted from the original data region 402. Note that if one data is selected or no data is selected, the "multi delete" button 414 can be disabled, for example, grayed out.

Upon completion of editing of the book, as described above, the user can execute printing of the book by pressing a print setting button 416. That is, the bookbinding application 201 outputs application data based on the data of the book including the page data arranged in an order according to the above edit processing. Then, the printer driver 202 generates print data based on the output application data. Note that for side stitch (1-in-1) where n is an integer of 1 or more, double-sided printing is executed so that the (2n−1)th page and 2nth page have the front-back relationship. Note that double-sided printing is executed so that the front cover and its back surface have the front-back relationship and the back cover and its back surface have the front-back relationship.

[Case in Which Saddle Stitch Is Selected and Covers and Text Are Created by Same Type of Sheets]

Figure 6:
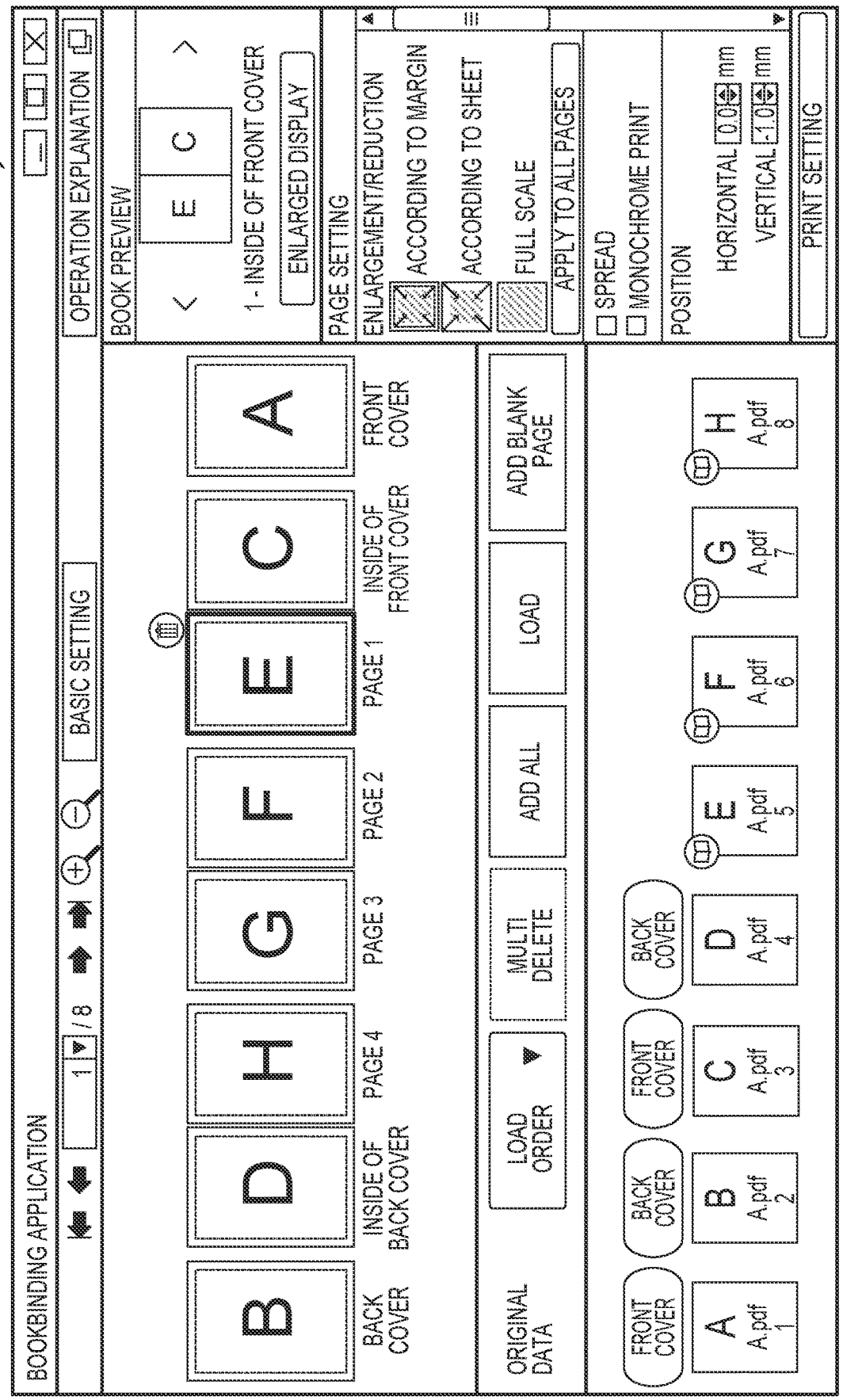
FIG. 6 is a view showing an example of the edit screen in the bookbinding application.

Subsequently, an example of the edit screen when the binding method is saddle stitch (2-in-1), and the setting of using the same type of sheets for the covers and text is made will be described with reference to FIG. 6. The edit screen in this case is almost the same as that shown in FIG. 4. However, in the case of saddle stitch, the binding positions are between the pages, and thus the marks indicating the binding positions are not displayed, as shown in a screen example 600 of FIG. 6. Note that when printing on a paper surface, the marks indicating the binding positions may be displayed at predetermined positions between the pages.

Note that if the binding method is saddle stitch (2-in-1), 2-in-1 double-sided printing is executed, and thus the number of pages per sheet is four. Therefore, if the number of pages added to the edit region 401 is not a multiple of 4, a page such as a blank page can be added to the end so that the total number of pages is a multiple of 4.

Note that if the binding method is saddle stitch (2-in-1) and right-side binding is selected, when N represents the total number of pages and m is an integer of 0 or more, the front surface of one sheet including the (N/2+2m+2)th page on the right side and the (N/2−2m−1)th page on the left side is printed. Then, the back surface of the sheet including the (N/2−2m)th page on the right side and the (N/2+2m+1)th page on the left side is printed. If, for example, N=8, the front surface including the sixth page on the right side and the third page on the left side and the back surface including the fourth page on the right side (the back side of the third page) and the fifth page on the left side (the back side of the sixth page) are printed on both surfaces of one sheet. Similarly, the front surface including the eighth page on the right side and the first page on the left side and the back surface including the second page on the right side (the back side of the first page) and the seventh page on the left side (the back side of the eighth page) are printed on both surfaces of one sheet. The front surface on which the back cover is laid out on the right side and the front cover is laid out on the left side and the back surface on which the back surface of the front cover is laid out on the right side and the back surface of the back cover is laid out on the left side are printed on both surfaces of one sheet. Note that the same applies to left-side binding except that the above relationship between the right and left sides is reversed.

[Case in which Side Stitch is Selected and Covers and Text are Created by Different Types of Sheets]

Figure 7:
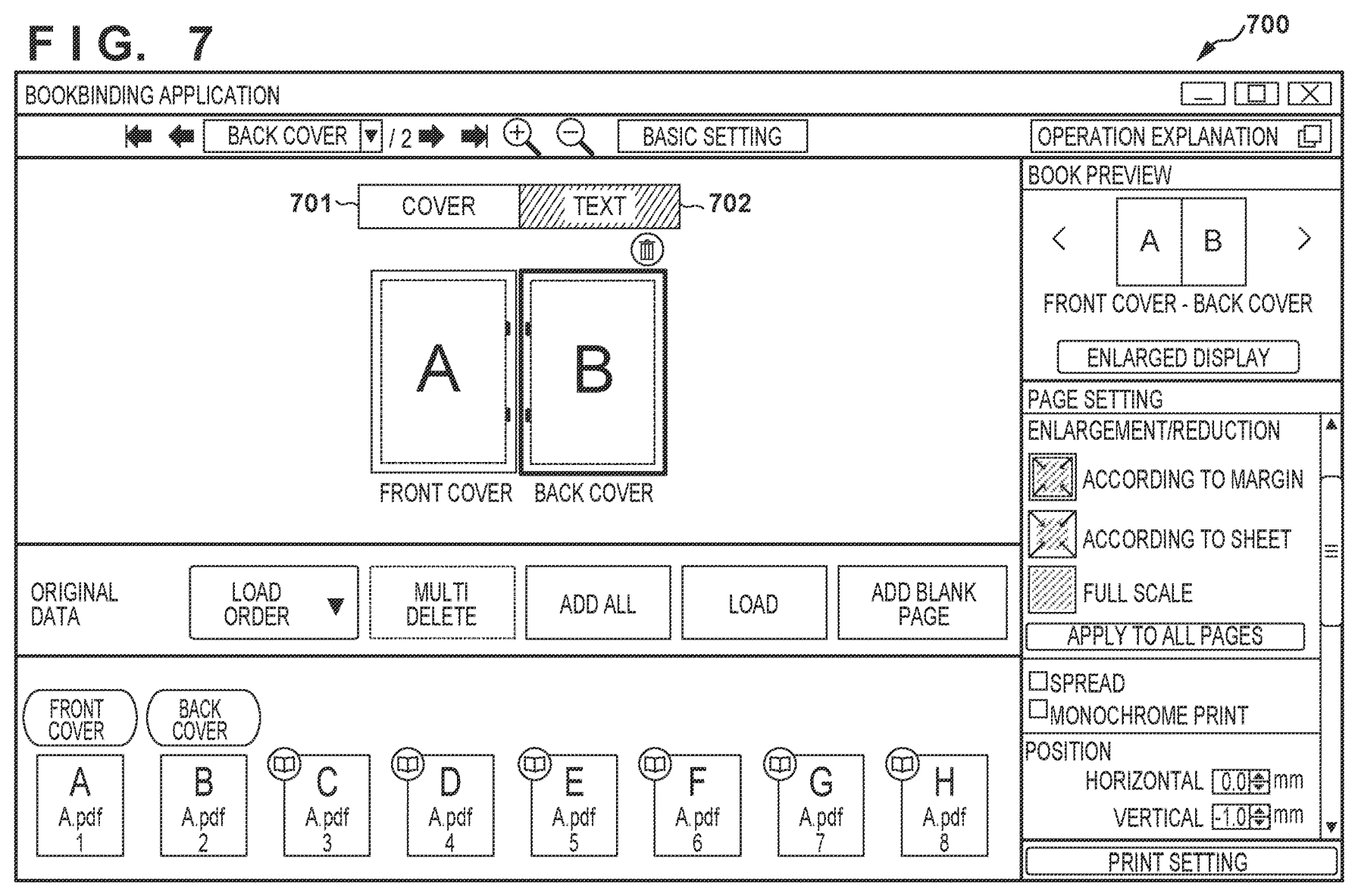
Figure 8:
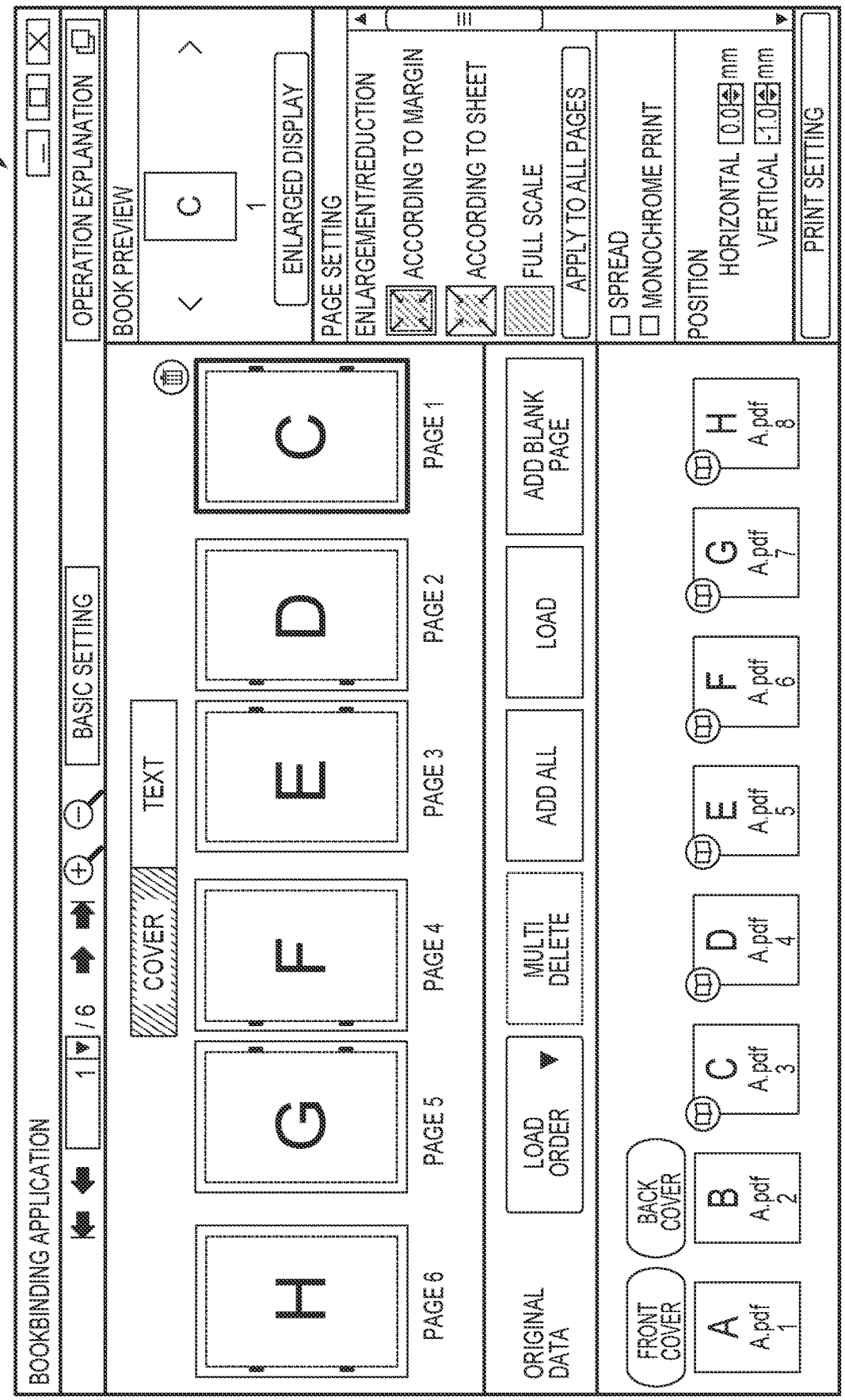
FIG. 8 is a view showing an example of the edit screen in the bookbinding application.

Subsequently, an example of the edit screen when the binding method is side stitch (1-in-1) and the setting of using different types of sheets for the covers and text is made will be described with reference to FIGS. 7 and 8. When different types of sheets are used for the covers and text, a cover edit screen 700 shown in FIG. 7 and a text edit screen 800 shown in FIG. 8 are used. Note that this form need not always be used but at least the screen is configured to execute printing of the covers and text independently. That is, in this case, the user needs to individually issue a cover print instruction and a text print instruction to the bookbinding application 201. If the cover edit screen 700 and the text edit screen 800 are separated, buttons for switching between the edit screens, for example, a cover selection button 701 and a text selection button 702 in FIG. 7 are displayed in the edit region 401. When the user selects the cover selection button 701, the cover edit screen 700 shown in FIG. 7 is displayed. When the user selects the text selection button 702, the text edit screen 800 shown in FIG. 8 is displayed. Note that these buttons may be displayed outside the edit region 401. Instead of the form of the button, for example, a tab form may be used. That is, a tab for the cover edit screen and a tab for the text edit screen may be displayed, and one of the tabs may be selected to switch the screen.

In the cover edit screen, only the front cover and the back cover are displayed, as shown in FIG. 7. Note that the front cover and the back cover are displayed in a form when viewing the book from the spine side. That is, for right-side binding, the front cover is displayed on the left side and the back cover is displayed on the right side. On the other hand, for left-side binding, the front cover is displayed on the right side and the back cover is displayed on the left side. If side stitch is used, binding positions are displayed. However, in the cover edit screen, the binding positions are displayed on the center side when the front cover and the back cover are laid out side by side, as shown in FIG. 7. In the cover edit screen 700, the positional relationship between the front cover and the back cover is reversed, as compared with the edit screen, shown in FIG. 4 or 6, in which the covers and the text are collectively edited. This display allows the user to readily recognize how the book after bookbinding looks like from the spine side when the book is opened.

Note that in this embodiment, if different types of sheets are used for the covers and text, the back surface of the front cover or that of the back cover is not used (that is, the back surface is blank). The present invention, however, is not limited to this. If the back surface of the front cover or that of the back cover is used, the cover edit screen displays, for example, the back surface of the front cover adjacent to the front cover and the back surface of the back cover adjacent to the back cover. In the example of FIG. 7, the back surface of the front cover can be displayed on the left side of the front cover and the back surface of the back cover can be displayed on the right side of the back cover.

As shown in FIG. 8, in the text edit screen, the text except for the front cover and the back cover (and their back surfaces) is displayed in the edit region. The edit screen shown in FIG. 8 is the same as that shown in FIG. 4 except that the front cover, the back cover, and their back surfaces are not included.

[Case in which Saddle Stitch is Selected and Covers and Text are Created by Different Types of Sheets]

The edit screen when saddle stitch is selected and the setting of using different types of sheets for the covers and text is made is the same as that shown in FIG. 7 or 8 except that the marks of the binding positions are not displayed. Note that for saddle stitch, the number of pages needs to be a multiple of 4, as described above. However, if different types of sheets are used for the covers and text, the number of pages of the text needs to be a multiple of 4. That is, in the above-described example, adjustment is performed so that the total number of pages of the covers and text is a multiple of 4. In this example, however, adjustment is performed so that the number of pages of only the text is a multiple of 4. As a result, in this example, if the back surfaces of the covers undergo single-sided printing, the total number of pages of the covers and text is not a multiple of 4 (when a is an integer, the total number of pages is given by (4a+2)). For example, if an edit operation is performed so that the text includes data for six pages, 2 blank pages or the like is inserted so that the number of pages of the text is a multiple of 4.

Figure 9:
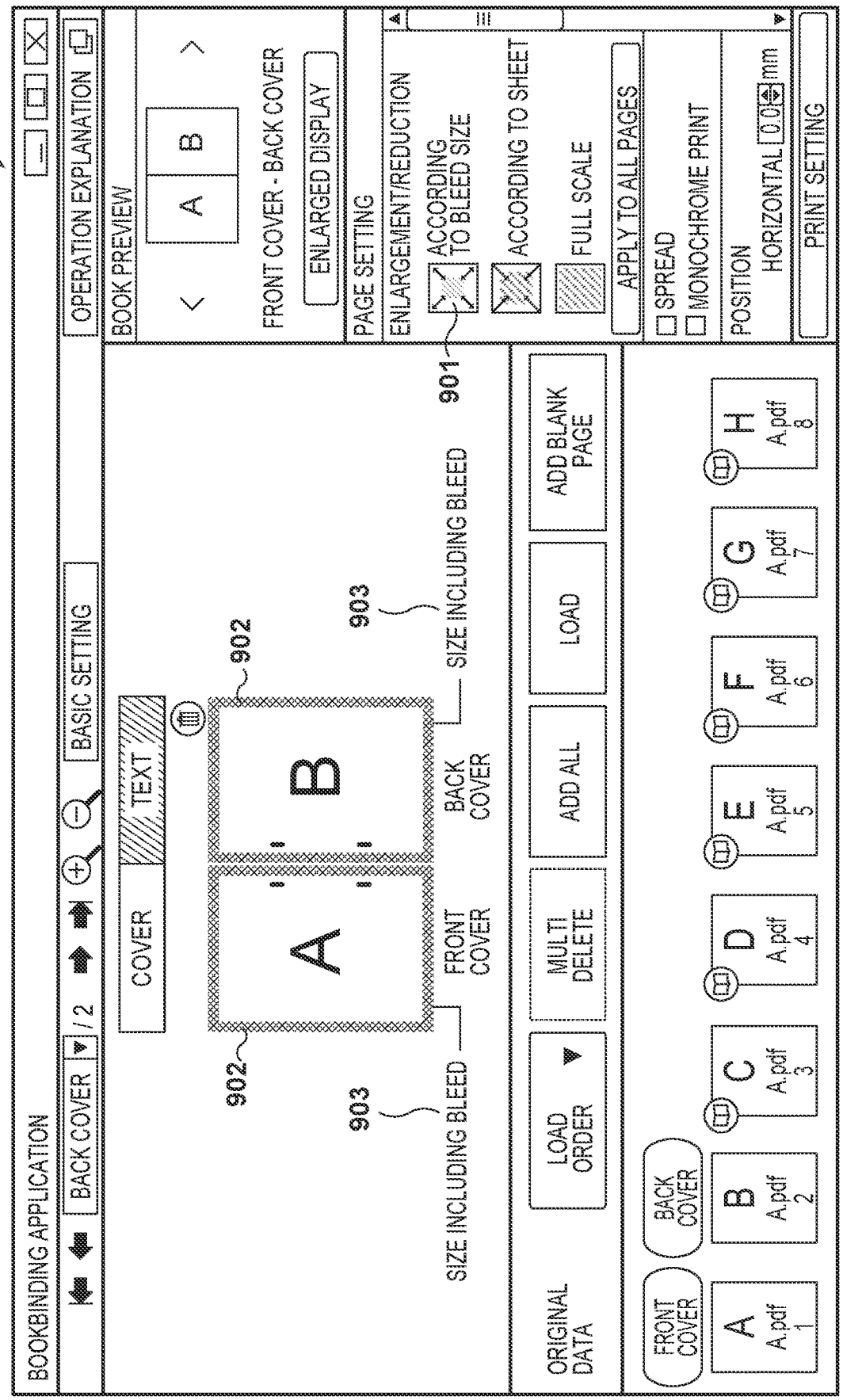
FIG. 9 is a view showing an example of the edit screen in the bookbinding application.

Note that if the setting of using different types of sheets for the covers and text is performed, the covers can undergo borderless printing by using, for example, glossy paper. FIG. 9 shows an example of the edit screen in this case. When executing borderless printing, so-called "bleed" needs to be added such that a print target image has a size larger than the finished size. Therefore, if paper such as glossy paper that can undergo borderless printing is selected, a region 902 of a size including bleed and an explanation 903 can be displayed. Furthermore, an option 901 used to adapt to a size including bleed by enlargement/reduction of page data is displayed. This allows the user to create covers by borderless printing by only performing a simple operation.

(Print Setting)

Upon completion of the edit processing using the screens shown in FIGS. 4 to 9, the user selects a print setting button included in each of these screens. The user performs further print setting processing using a print setting screen selected by selecting the print setting button, thereby selecting print execution. This processing sends application data generated by the bookbinding application to the printer driver corresponding to the printer selected in FIG. 3, and the printer driver generates print data based on the application data. Note that if the covers and text are printed on the same type of sheets, the application data includes pages laid out in the covers and the pages laid out in the text. On the other hand, if the covers and text are printed on the different types of sheets, the covers and the text are printed independently. Therefore, the above-described print setting screen prepares an option for selecting the covers or the text as a print target. In this case, if the user instructs printing in the state in which the covers are selected, the application data includes only pages laid out in the covers, and the printer driver generates print data for the covers. On the other hand, If the user instructs printing in the state in which the text is selected, the application data includes only pages laid out in the text, and the printer driver generates print data for the text.

Figure 10:
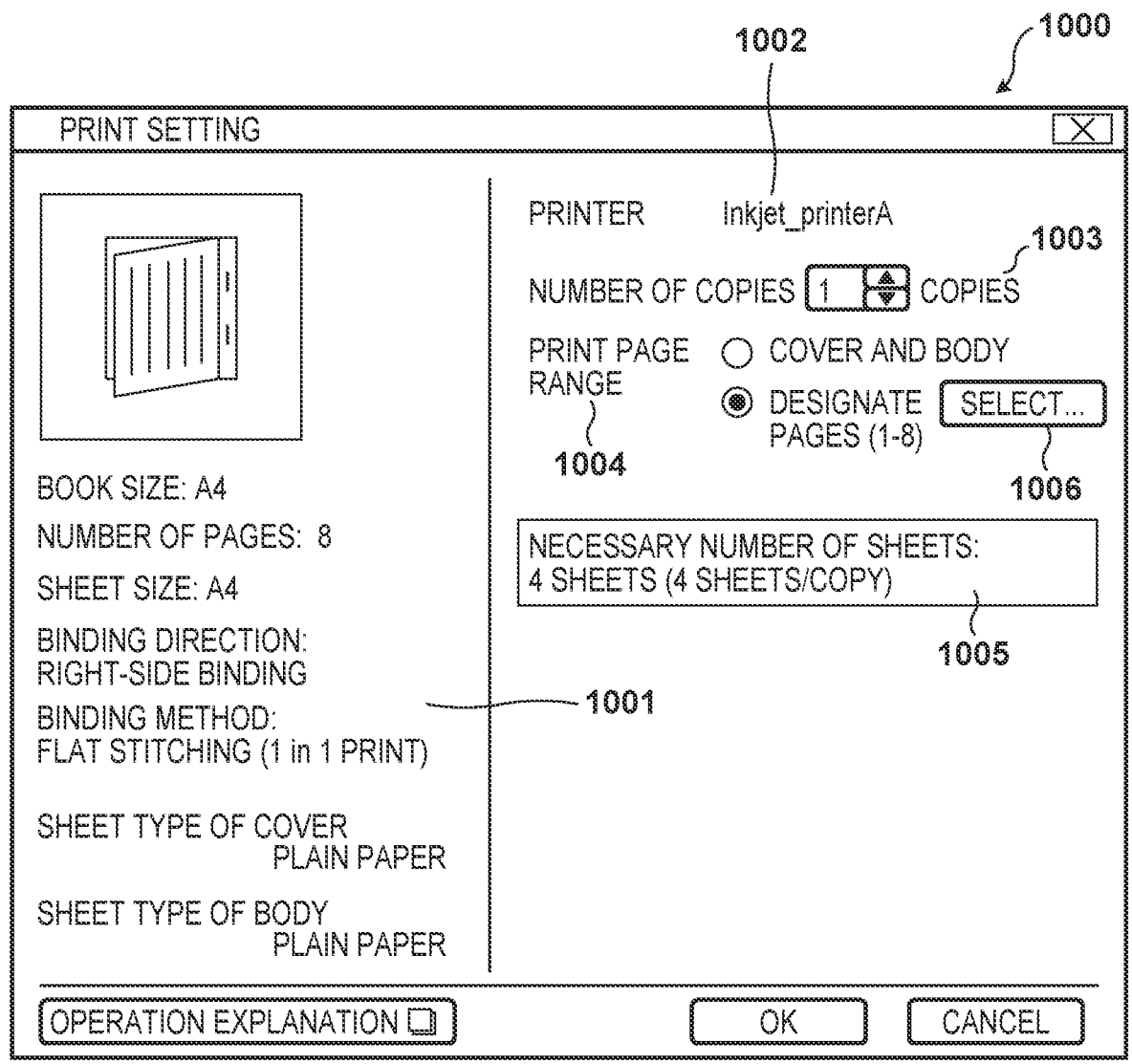
FIG. 10 is a view showing an example of a print setting screen of the bookbinding application.

FIG. 10 shows an example of a print setting screen 1000 displayed when the print setting button is selected after completion of the edit processing in the screen shown in FIG. 4 or the like in a state in which the basic settings shown in FIG. 3 are made. The print setting screen 1000 includes regions 1001 and 1002, a number-of-copies setting region 1003, and a region 1004 for setting a print range.

The regions 1001 and 1002 are regions where the information set in the basic setting screen 300 shown in FIG. 3 is presented. When changing the information in the regions 1001 and 1002, the user can perform change processing by pressing "cancel" to return to the edit screen, and then pressing a "basic setting" button in the edit screen to return to the basic setting screen 300 shown in FIG. 3. The number-of-copies setting region 1003 is a region where the number of books to be created is set. The region 1004 is a region to set whether to print all of the text and the covers or print only some pages. For example, the user can print all the pages collectively by selecting a radio button corresponding to "covers and text". Note that if the text and the covers are created by different types of sheets, display of "text and covers" is divided into two items of "text" and "covers". This makes it possible to select one of a mode of printing all the text collectively (not printing the covers) and a mode of printing all the covers collectively (not printing the text). On the other hand, the user can print only some pages by selecting a radio button corresponding to "page designation". Note that numerical values "(1-8)" displayed on the right side of "page designation" indicate page numbers of the book. In this case, the first to eighth pages are set as a print target area. Note that the number of sheets is determined in accordance with settings of the total number of pages, the binding method, and the like, and information about the number of sheets is displayed in a region 1005. This allows the user to recognize the number of sheets to be set in the printing apparatus.

As described above, in the conventional technique, it is possible to print only some pages by designating a sheet number. However, the sheet number of a predetermined page can be determined based on a setting or the like. Therefore, a page different from that expected by the user may be printed with a sheet number set by the user.

Figure 11A:
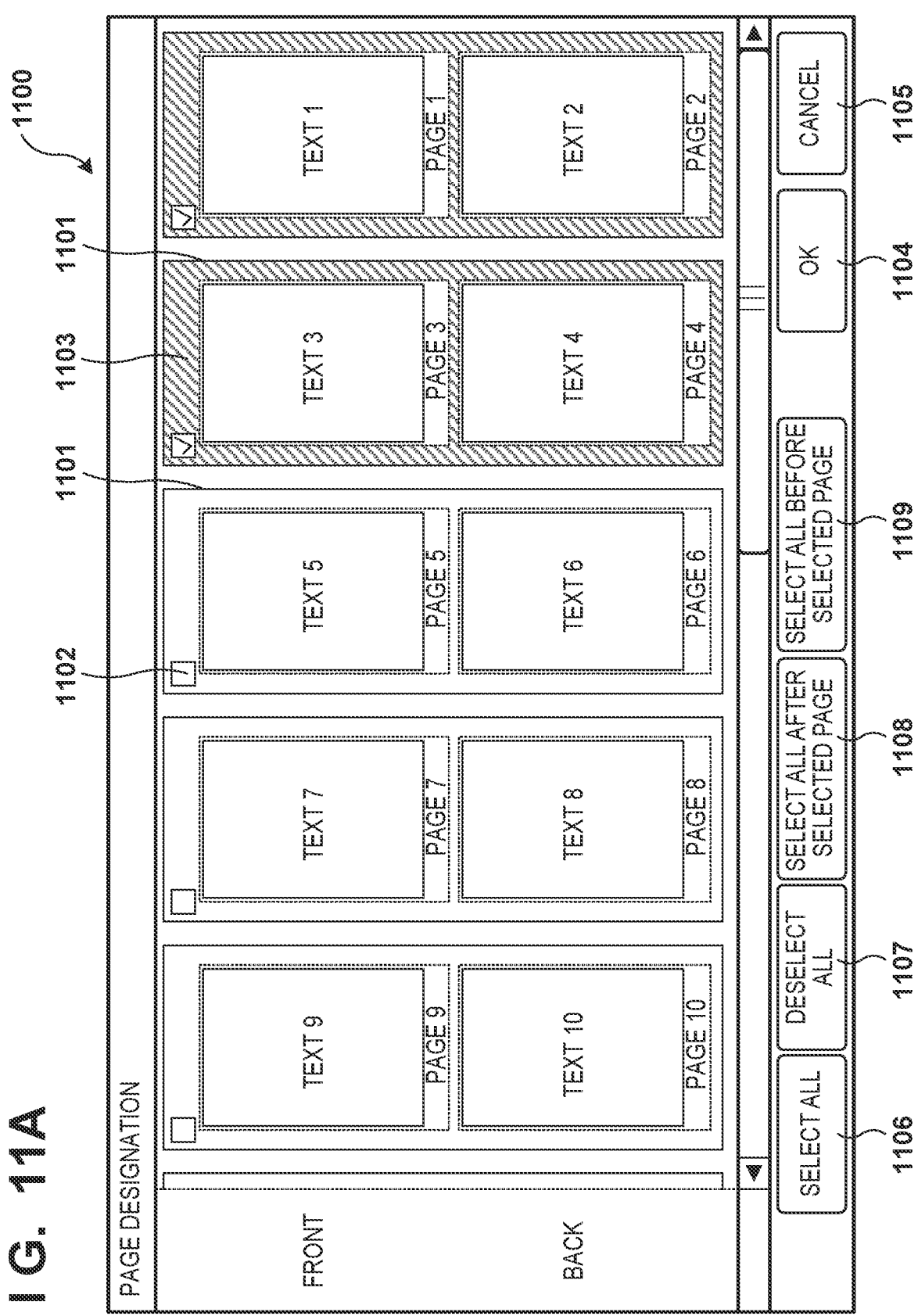

To solve this problem, this embodiment provides a setting screen for allowing the user to intuitively select a page to be printed. That is, in this embodiment, when a "select" button 1006 shown in FIG. 10 is pressed, a page designation printing setting screen 1100 shown in FIG. 11A is displayed. Note that for the sake of descriptive convenience, the number of pages of a book to be created is 40 in FIG. 11A and similar views. In this setting screen 1100, a page layout for each sheet is displayed. That is, the layout of page data to be printed on the front surface and the back surface of each sheet is displayed in a frame 1101 indicating the sheet so that the page data allocated to each sheet can be discriminated. For example, the example of FIG. 11A shows a state in which with respect to the second sheet from the right, page data with "text 3" written is laid out on the front surface and page data with "text 4" written is laid out on the back surface. Note that "text X" in FIG. 11A and the subsequent views is an expression for the sake of convenience. In fact, a preview screen of the contents of the page is displayed. That is, each of contents of page data selected from original data is displayed. Note that preview images displayed on the setting screen shown in each of FIGS. 11A and 11B and the like indicate the print results of the sheets forming the book, and may thus be called sheet preview images. The sheet preview images are generated based on the plurality of page data and the print setting information. The difference between the edit screens shown in FIGS. 4 to 9 and the setting screens shown in FIGS. 11A to 13B will now be described. The edit screens described with reference to FIGS. 4 to 9 each include page preview images based on the page data sorted in the order of the pages which appear when the user turns over the printed book. On the other hand, FIGS. 11A to 13B each include sheet preview images indicating a result of laying out the page data on the sheets so that the contents of the page data appear in the page order when the user turns over the printed book. Thus, if, for example, saddle stitch is set, the page preview images are sorted, in the edit screen shown in FIG. 6, in the order (that is, the order of the first page, second page, . . . ) of the pages which appear when the user turns over the printed book. On the other hand, if saddle stitch is set, the page data are laid out on the sheets in an order different from the order (that is, the order of the first page, second page, . . . ) of the pages which appear when the user turns over the printed book. For example, the page data of the first and 40th pages are laid out on the front surface of the first sheet, and the page data of the second and 39th pages are laid out on the back surface of the first sheet. As described above, the displayed preview images are different between the edit screen and the setting screen.

In the page designation printing setting screen 1100, a corresponding checkbox 1102 is provided for each frame 1101. Then, the user can select a print target sheet by selecting the corresponding checkbox 1102. Note that the checkbox 1102 is displayed inside the corresponding frame 1101 in FIG. 11A but may be laid out at a position where the correspondence relationship with the frame 1101 can be discriminated, such as a predetermined position on the upper, lower, left, or right side outside the frame 1101 or a predetermined position on the line of the frame 1101. Furthermore, the checkbox 1102 is merely an example, and another interface such as a button that allows the user to readily select a sheet may be used. In addition, when the checkbox 1102 is selected, predetermined display can be performed so as to readily recognize that the checkbox 1102 is selected, for example, the color of a region inside the frame 1101 corresponding to the checkbox 1102 is changed. In the example of FIG. 11A, selection of the first and second sheets from the right is highlighted by filling, as indicated by regions 1103. When an "OK" button 1104 is pressed in this state, the setting of printing the selected sheets is reflected on the print setting screen 1000. Then, when an "OK" button is pressed in the print setting screen 1000, the selected sheets are printed. Note that if print target sheets are selected, the information displayed in the region 1005 can be changed in accordance with the number of sheets. This can accurately notify the user of the number of sheets required for printing.

Note that when a "cancel" button 1105 is pressed in the page designation printing setting screen 1100, even if the sheets have been selected, the screen returns to the print setting screen 1000 without reflecting the selection.

In the page designation printing setting screen 1100, a plurality of sheets can be selected collectively. For example, when the user presses a "select all" button 1106, the checkboxes 1102 corresponding to all the displayed sheets are selected. By, for example, deselecting some sheets in this state, the user can set a number of sheets as print targets collectively without selecting the checkboxes 1102 individually. In addition, the user can deselect the selected checkboxes 1102 by pressing a "deselect all" button 1107. Since this shifts the state to the initial state in which no sheets are selected, the user can select a print target sheet again. The user can collectively select sheets after the focused page by pressing a "select all after selected page" button 1108. For example, FIG. 11A assumes that the user presses the "select all after selected page" button 1108 in a state in which a sheet including a page with "text 6" written is selected. In this case, the checkboxes 1102 of the third sheet from the right and all the sheets laid out on the left side of the third sheet are selected. In this way, for example, when printing of sheets after a given page fails due to a paper jam or ink shortage, and then pages except for a successfully printed portion are reprinted, the user can readily select print targets. Similarly, the user can collectively select sheets before the focused page by pressing a "select all before selected page" button 1109. For example, in FIG. 11A, when the user presses the "select all before selected page" button 1109 in a state in which the sheet including the page with "text 6" written is selected, the checkboxes 1102 of the first to third sheets from the right are selected. In this way, for example, when printing of first several pages fails and thus these pages are reprinted, the user can readily select print targets.

Note that the display order of the sheets may be different between a case in which right-side binding is selected in the basic settings and a case in which left-side binding is selected in the basic settings. For example, if right-side binding is selected, the setting screen 1100 shown in FIG. 11A in which the pages advance from right to left can be displayed. If left-side binding is selected, a setting screen 1110 shown in FIG. 11B in which the pages advance from left to right can be displayed. This can provide an interface that is intuitively understood by the user.

Figure 12A:
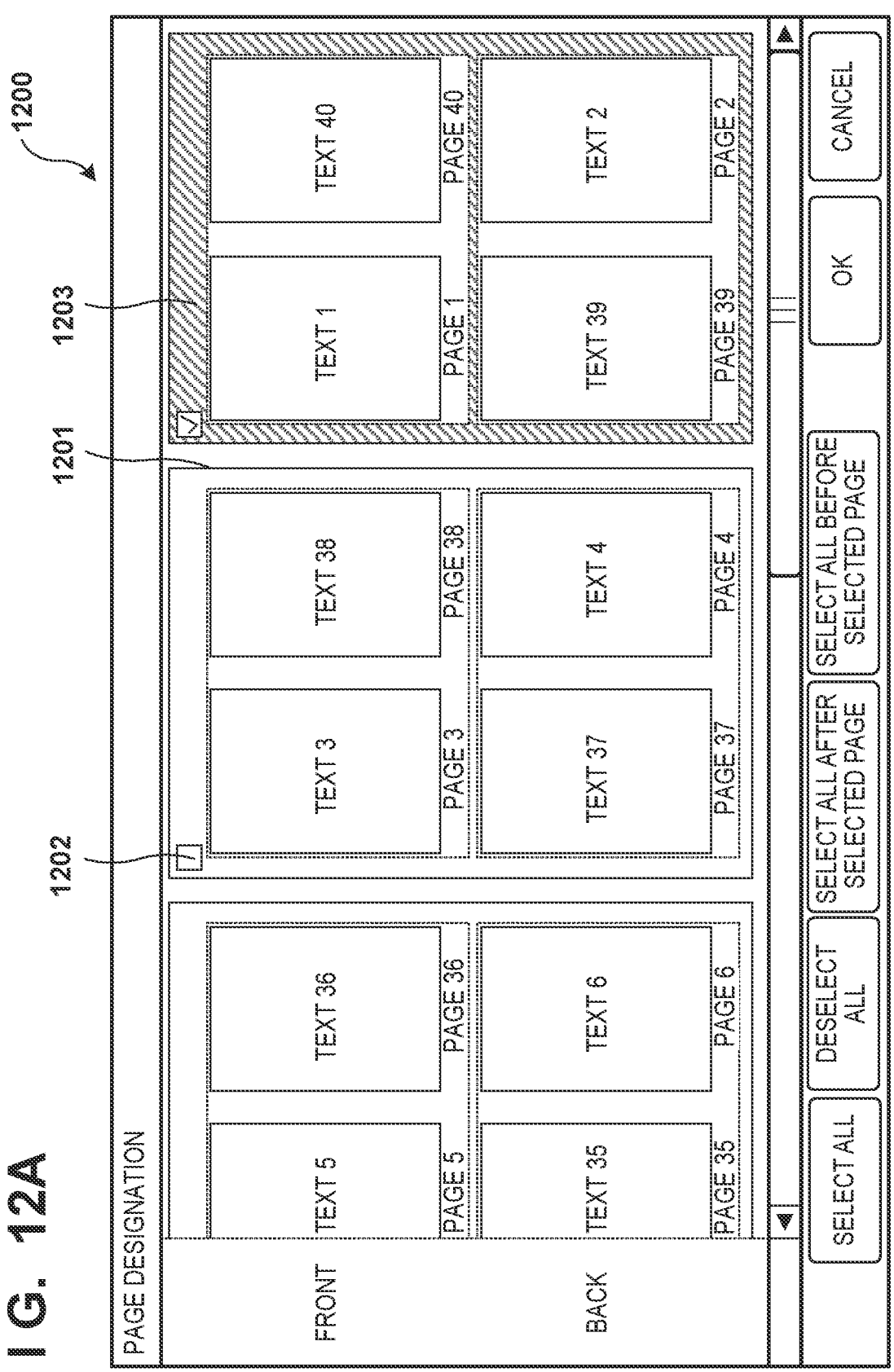

FIGS. 12A and 12B each show an example of the page designation printing setting screen when saddle stitch is selected. FIG. 12A shows a setting screen 1200 by exemplifying a case in which right-side binding is selected. FIG. 12B shows a setting screen 1210 by exemplifying a case in which left-side binding is selected. As described above, if saddle stitch (2-in-1) and right-side binding are selected, when N represents the total number of pages and m is an integer of 0 or more, on one sheet, the (N/2+2m+2)th page is printed on the right side of the front surface of the target sheet and the (N/2−2m−1)th page is printed on the left side of the front surface of the target sheet. Then, the (N/2−2m)th page is printed on the right side of the back surface of the same target sheet, and the (N/2+2m+1)th page is printed on the left side. This example exemplifies a case in which the total number N of pages is 40. Therefore, the (40/2+2m+2)th page (the 40th page for m=9) is printed on the right side of the front surface, and the (40/2−2m−1)th page (the first page for m=9) is printed on the left side of the front surface. In addition, the (40/2−2m)th page (the second page for m=9) is printed on the right side of the back surface, and the (40/2+2m+1)th page (the 39th page for m=9) is printed on the left side of the back surface. Similarly, when left-side binding is selected, on the front surface of one sheet, the (N/2−2m−1)th page is printed on the right side and the (N/2+2m+2)th page is printed on the left side. On the back surface of the sheet, the (N/2+2m+1)th page is printed on the right side and the (N/2−2m)th page is printed on the left side. As described above, when saddle stitch is selected, it is necessary to perform predetermined calculation to identify pages to be printed on each sheet. To the contrary, in this embodiment, when all pages to be printed on each sheet are surrounded by a frame 1201 as in the setting screen 1200 (and setting screen 1210), the user can readily, visually grasp contents to be printed on each sheet. Then, the user can readily select a sheet to be printed by selecting a checkbox 1202. Similar to FIGS. 11A and 11B, when a region 1203 corresponding to a selected sheet is filled, the user can clearly recognize the selected sheet.

Note that when printing a book, for example, sheets overlapping each other are conveyed (double feed), and thus a sheet with only one surface printed may be output. In this case, since the one surface has successfully been printed, printing of only the back surface of the sheet may be requested. To cope with this, as shown in, for example, FIGS. 13A and 13B, checkboxes 1302 and 1312 that respectively allow selection of the front surface and the back surface are provided in addition to checkboxes 1301 and 1311 for selecting sheets. When one of the checkboxes 1302 (checkboxes 1312) is selected (deselected), only page data laid out on one selected surface of the selected sheet is identified as a print target. This makes it possible to readily set whether to print one or both of the front surface and the back surface. Note that in FIGS. 13A and 13B, the checkboxes 1302 and 1312 each for designating the surface are displayed for all the sheets. However, a screen of a different form may be displayed. For example, when one sheet is selected, the checkboxes 1302 or 1312 can be displayed on only the surface of the selected sheet. That is, when the checkbox 1301 (or checkbox 1311) is selected, the checkboxes 1302 (or checkboxes 1312) are displayed. On the other hand, the checkboxes for designating the surfaces of other sheets are not displayed. Alternatively, when a plurality of sheets are selected, the checkboxes 1302 or 1312 need not be displayed.

Note that in the print setting screen 1000, an option for accepting the numerical value of a sheet number for identifying a sheet to be printed may be prepared without using the above-described setting screen. That is, the above-described layout display of pages for each sheet to select a print target sheet may be used as one option, or a print target sheet may be identified by another method that does not use sheet selection based on layout display.

As described above, in the page designation printing setting screen according to this embodiment, layout display of the pages of the original data for each of the plurality of sheets forming the book is performed. Then, when a print target sheet can be accepted in the setting screen, it is possible to readily identify the print target sheet, thereby improving the convenience of bookbinding printing.

Note that when the OK button displayed in one of FIGS. 11A to 12B is pressed in a state in which a print target sheet is selected using one of FIGS. 11A to 12B, the bookbinding application 201 displays the screen shown in FIG. 10. If the OK button in FIG. 10 is pressed at this timing, the bookbinding application 201 generates application data using page data to be laid out on the sheet selected in one of FIGS. 11A to 12B, and instructs the printer driver 202 to execute printing. On the other hand, page data laid out on a sheet that is not selected using one of FIGS. 11A to 12B are not printed.

Figure 13B:
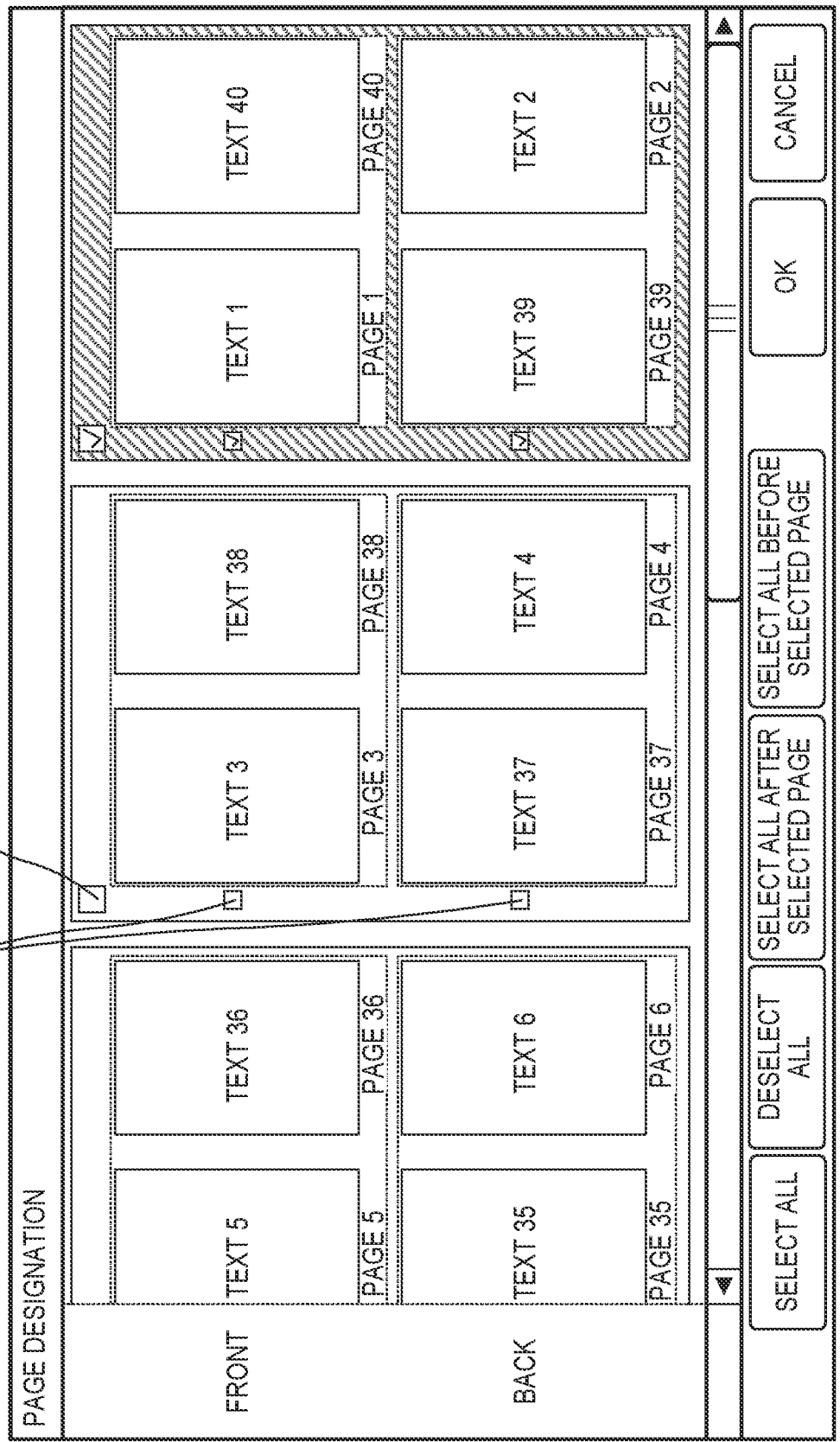

Furthermore, if the checkbox 1302 or 1312 is selected in FIG. 13A or 13B, the bookbinding application 201 generates application data using page data laid out on a selected surface, and instructs the printer driver 202 to execute printing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125293, filed Jun. 29, 2018, which is hereby incorporated by reference herein in its entirety.

What is claimed is:

1. An information processing apparatus comprising:
   at least one processor; and
   at least one memory coupled to the at least one processor, wherein the at least one memory stores a computer program that causes, when executed by the at least one processor, the information processing apparatus to:
   (1) cause a display to display, based on a plurality of page data included in data of a book and print setting information, a setting screen including (a) a first selection part for accepting selection of a first sheet and a first sheet preview image indicating a print result of the first sheet forming the book and (b) a second selection part for accepting selection of a second sheet and a second sheet preview image indicating a print result of the second sheet forming the book; and
   (2) instruct, in a case where the first selection part is selected but the second selection part is not selected in the setting screen, execution of print processing based on first page data for the first sheet, and instruct, in a case where the second selection part is selected but the first selection part is not selected in the setting screen, execution of print processing based on second page data for the second sheet,
   wherein print processing based on the second page data for the second sheet is not executed in a case where the first selection part is selected but the second selection part is not selected in the setting screen, and print processing based on the first page data for the first sheet is not executed in a case where the second selection part is selected but the first selection part is not selected in the setting screen.

2. The apparatus according to claim 1, wherein the computer program further causes the information processing apparatus to:
   cause the display to display, when a binding method of the book is a first binding method, the setting screen including the first sheet preview image to which the first page data is allocated using a first layout and the second sheet preview image to which the second page data is allocated using the first layout; and
   cause the display to display, when the binding method of the book is a second binding method different from the first binding method, the setting screen including the first sheet preview image to which the first page data is allocated using a second layout different from the first layout and the second sheet preview image to which the second page data is allocated using the second layout.

3. The apparatus according to claim 2, wherein the second binding method is saddle stitch that generates a book by overlapping a plurality of printed sheets and then doubling the sheets.

4. The apparatus according to claim 1, wherein the computer program further causes the information processing apparatus to:
   cause the display to display the setting screen in which the first sheet preview image and the second sheet preview image are sorted in a first order when a binding direction of the book is a first direction; and
   cause the display to display the setting screen in which the first sheet preview image and the second sheet preview image are sorted in a second order different from the first order when the binding direction of the book is a second direction different from the first direction.

5. The apparatus according to claim 1, wherein the computer program further causes the information processing apparatus to cause the display to display the setting screen further including an interface for accepting selection of whether to print one or both of a front surface and a back surface of the sheet selected by the user.

6. The apparatus according to claim 5, wherein the computer program further causes the information processing apparatus to prevent, when a plurality of sheets are selected, the interface from being displayed on the display.

7. A non-transitory computer-readable storage medium that stores a program for causing a computer to:
   perform display control of causing a display to display, based on a plurality of page data included in data of a book and print setting information, a setting screen including (a) a first selection part for accepting selection of a first sheet and a first sheet preview image indicating a print result of the first sheet forming the book and (b) a second selection part for accepting selection of a second sheet and a second sheet preview image indicating a print result of the second sheet forming the book; and
   instruct, in a case where the first selection part is selected but the second selection part is not selected in the setting screen, execution of print processing based on first page data for the first sheet, and instruct, in a case where the second selection part is selected but the first selection part is not selected in the setting screen, execution of print processing based on second page data for the second sheet,
   wherein print processing based on the second page data for the second sheet is not executed in a case where the first selection part is selected but the second selection part is not selected in the setting screen, and print processing based on the first page data for the first sheet is not executed in a case where the second selection part is selected but the first selection part is not selected in the setting screen.

8. The medium according to claim 7, wherein the program causes the computer to:
cause the display to display, when a binding method of the book is a first binding method, the setting screen including the first sheet preview image to which the first page data is allocated using a first layout and the second sheet preview image to which the second page data is allocated using the first layout; and
cause the display to display, when the binding method of the book is a second binding method different from the first binding method, the setting screen including the first sheet preview image to which the first page data is allocated using a second layout different from the first layout and the second sheet preview image to which the second page data is allocated using the second layout.

9. The medium according to claim 8, wherein the second binding method is saddle stitch that generates a book by overlapping a plurality of printed sheets and then doubling the sheets.

10. The medium according to claim 7, wherein the program causes the computer to:
cause the display to display the setting screen in which the first sheet preview image and the second sheet preview image are sorted in a first order when a binding direction of the book is a first direction; and
cause the display to display, the setting screen in which the first sheet preview image and the second sheet preview image are sorted in a second order different from the first order when the binding direction of the book is a second direction different from the first direction.

11. The medium according to claim 7, wherein the program causes the computer to, in the display control, cause the display to display the setting screen further including an interface for accepting selection of whether to print one or both of a front surface and a back surface of the sheet selected by the user.

12. The medium according to claim 11, wherein the program causes the computer to prevent, when a plurality of sheets are selected, the interface from being displayed on the display.

13. A control method for an information processing apparatus, the method comprising:
causing a display to display, based on a plurality of page data included in data of a book and print setting information, a setting screen including (a) a first selection part for accepting selection of a first sheet and a first sheet preview image indicating a print result of the first sheet forming the book and (b) a second selection part for accepting selection of a second sheet and a second sheet preview image indicating a print result of the second sheet forming the book; and
instructing, in a case where the first selection part is selected but the second selection part is not selected in the setting screen, execution of print processing based on first page data for the first sheet, and instructing, in a case where the second selection part is selected but the first selection part is not selected in the setting screen, execution of print processing based on second page data for the second sheet,
wherein print processing based on the second page data for the second sheet is not executed in a case where the first selection part is selected but the second selection part is not selected in the setting screen, and print processing based on the first page data for the first sheet is not executed in a case where the second selection part is selected but the first selection part is not selected in the setting screen.

14. The method according to claim 13, wherein when a binding method of the book is a first binding method, the setting screen including the first sheet preview image to which the first page data is allocated using a first layout and the second sheet preview image to which the second page data is allocated using the first layout is displayed on the display, and
wherein when the binding method of the book is a second binding method different from the first binding method, the setting screen including the first sheet preview image to which the first page data is allocated using a second layout different from the first layout and the second sheet preview image to which the second page data is allocated using the second layout is displayed on the display.

15. The method according to claim 14, wherein the second binding method is saddle stitch that generates a book by overlapping a plurality of printed sheets and then doubling the sheets.

16. The apparatus according to claim 1, wherein, in a case where the first selection part is selected but the second selection part is not selected in the setting screen, a first area corresponding to the first selection part and the first sheet preview image is displayed in a different manner from a second area corresponding to the second selection part and the second preview image.

17. The medium according to claim 7, wherein, in a case where the first selection part is selected but the second selection part is not selected in the setting screen, a first area corresponding to the first selection part and the first sheet preview image is displayed in a different manner from a second area corresponding to the second selection part and the second preview image.

18. The method according to claim 13, wherein, in a case where the first selection part is selected but the second selection part is not selected in the setting screen, a first area corresponding to the first selection part and the first sheet preview image is displayed in a different manner from a second area corresponding to the second selection part and the second preview image.

* * * * *